US012096161B2

(12) United States Patent
Morikuni

(10) Patent No.: US 12,096,161 B2
(45) Date of Patent: Sep. 17, 2024

(54) PROJECTION SYSTEM, AND CONTROL METHOD FOR PROJECTION SYSTEM

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 104 days.

(21) Appl. No.: 18/085,529

(22) Filed: Dec. 20, 2022

(65) Prior Publication Data
US 2023/0199159 A1  Jun. 22, 2023

(30) Foreign Application Priority Data
Dec. 21, 2021 (JP) .................. 2021-206747

(51) Int. Cl.
*H04N 9/31* (2006.01)
*H04N 5/262* (2006.01)

(52) U.S. Cl.
CPC ......... *H04N 9/3194* (2013.01); *H04N 5/2628* (2013.01); *H04N 9/3147* (2013.01); *H04N 9/3188* (2013.01)

(58) Field of Classification Search
CPC .. H04N 9/3194; H04N 5/2628; H04N 9/3147; H04N 9/3188
USPC ...................................... 348/222.1
See application file for complete search history.

(56) References Cited

U.S. PATENT DOCUMENTS 6,219,099 B1 * 4/2001 Johnson ............... H04N 9/3147
                                              348/E17.005
9,930,307 B1 * 3/2018 Kursula ............... H04N 9/3194

FOREIGN PATENT DOCUMENTS

JP    2005-121747    5/2005
JP    2015-161748    9/2015
JP    2018-098598    6/2018

* cited by examiner

Primary Examiner — Joel W Fosselman
(74) Attorney, Agent, or Firm — JCIPRNET

(57) ABSTRACT

A projection system having a first projection device and a second projection device is provided. The first projection device communicates with the second projection device to receive a first reception image, projects the first reception image onto a first projection target, captures a range including the first projection target, generates a first transmission image by removing, from a captured image of the first projection target, an image overlapping the first reception image, and transmits the first transmission image to the second projection device. The second projection device communicates with the first projection device to receive a second reception image, projects the second reception image onto a second projection target, captures a range including the second projection target, generates a second transmission image by removing, from a captured image, an image overlapping the second reception image, and transmits the second transmission image to the first projection device.

9 Claims, 11 Drawing Sheets

PROJECTION SYSTEM, AND CONTROL METHOD FOR PROJECTION SYSTEM

The present application is based on, and claims priority from JP Application Serial Number 2021-206747, filed Dec. 21, 2021, the disclosure of which is hereby incorporated by reference herein in its entirety.

BACKGROUND

1. Technical Field

The present disclosure relates to a projection system and a control method for the projection system.

2. Related Art

In the related art, a technique of drawing characters or the like by superimposing them on an image projected or displayed by a projector is known. For example, the device disclosed in JP-A-2015-161748 detects handwritten characters superimposed on an image projected on a screen by capturing the screen with a camera. This device records the data of the detected characters on a recording medium in association with the projected video data and reproduces the video data with the handwritten characters superimposed thereon.

The device described in JP-A-2015-161748 requires data recorded on a recording medium to reproduce video data and handwritten characters. In such a configuration, it is difficult for a plurality of devices to share the image projected by the projector or the image captured by the camera.

SUMMARY

An aspect of the present disclosure is a projection system including a first projection device and a second projection device, the first projection device includes a first communication unit that communicates with the second projection device to receive a first reception image, a first projection unit that projects the first reception image onto a first projection target, and a first image-capturing unit that captures a range including the first projection target, and generates a first transmission image by removing, from a first photograph image captured by the first image-capturing unit, an image overlapping the first reception image and transmits the first transmission image by using the first communication unit, and the second projection device includes a second communication unit that communicates with the first projection device to receive a second reception image, a second projection unit that projects the second reception image onto a second projection target, and a second image-capturing unit that captures a range including the second projection target, and generates a second transmission image by removing, from a second captured image captured by the second image-capturing unit, an image overlapping the second reception image and transmits the second transmission image by using the second communication unit.

Another aspect of the present disclosure is a control method for a first projection device, a second projection device, and a projection system, in which the first projection device communicates with the second projection device to receive a first reception image, projects the first reception image onto a first projection target, captures a range including the first projection target, and generates a first transmission image by removing, from a first captured image obtained by capturing the first projection target, an image overlapping the first reception image and transmits the first transmission image to the second projection device, and the second projection device communicates with the first projection device to receive a second reception image, projects the second reception image onto a second projection target, captures a range including the second projection target, and generates a second transmission image by removing, from a second captured image obtained by capturing the second projection target, an image overlapping the second reception image and transmits the second transmission image to the first projection device.

DESCRIPTION OF EXEMPLARY EMBODIMENTS

1. First Embodiment 1-1. Configuration of Projection System

Figure 1:
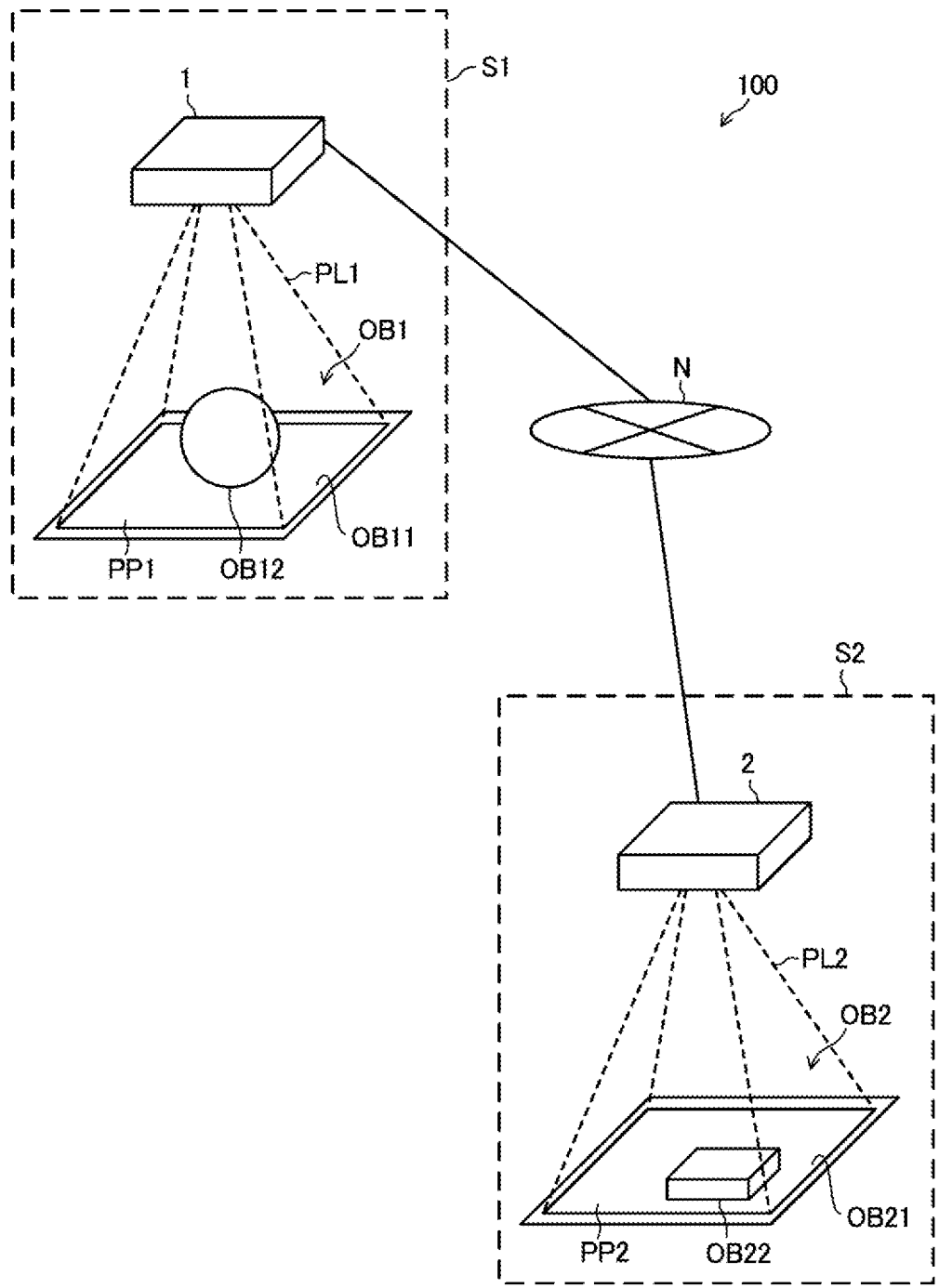
FIG. 1 is a diagram illustrating a schematic configuration of a projection system according to a first embodiment.

FIG. 1 is a diagram illustrating a schematic configuration of a projection system 100 according to a first embodiment. The projection system 100 includes a first projection device 1 and a second projection device 2. The first projection device 1 and the second projection device 2 are communicatively connected to each other via a communication network N.

There is no restriction on the installation location of the first projection device 1 and the second projection device 2, and for example, a use location S1 of the first projection device 1 and a use location S2 of the second projection device 2 may be separated or in proximity.

The communication network N is a network that enables data to be communicated between apparatuses. The communication network N may be, for example, a local network such as a local area network (LAN), or may be a wide area network. In addition, the communication network N may be, for example, an open network such as the Internet. The communication network N may be a communication line such as a dedicated line, a public line network, a cellular communication line, and may include a communication device such as a router or a gateway device. The first projection device 1 and the communication network N may be connected by wire by using a communication cable, or may be wirelessly connected by using a wireless communication path. Likewise, the second projection device 2 and the communication network N may be connected by wire by using a communication cable, or may be wirelessly connected by using a wireless communication path. The communication cable is, for example, a LAN cable or a USB cable compatible with the communication standard for the Universal Serial Bus (USB). The wireless communication path is configured by, for example, Wi-Fi or Bluetooth. Wi-Fi is a registered trademark. Bluetooth is a registered trademark.

The first projection device 1 projects imaging light PL1 toward a first projection target OB1 to form a projection image PP1 on the first projection target OB1. Projecting the imaging light PL1 by the first projection device 1 corresponds to displaying the projection image PP1 on the first projection target OB1. The second projection device 2 projects imaging light PL2 toward a second projection target OB2 to form a projection image PP2 on the second projection target OB2. Projecting the imaging light PL2 by the second projection device 2 corresponds to displaying the projection image PP2 on the second projection target OB2. In the following description, an image includes a video and a still image.

FIG. 1 illustrates a configuration in which the first projection device 1 is disposed above the first projection target OB1, and projects the imaging light PL1 downward from the first projection device 1. The first projection target OB1 includes, for example, a plane OB11 and an object OB12 placed in the plane OB11. Similarly, the second projection device 2 is installed above the second projection target OB2 and projects the imaging light PL2 downward. The second projection target OB2 includes a plane OB21 and an object OB22 placed on the plane OB21. The configuration of FIG. 1 is merely an example, and the planes OB11 and OB21 may be curved surfaces, or may be uneven surfaces. A position of the first projection device 1 and a direction in which the first projection device 1 is installed are determined in accordance with the positional relationship with the first projection target OB1. For example, the first projection device 1 may be installed in a direction in which the first projection device projects the imaging light PL1 horizontally or a direction in which the first projection device projects the imaging light PL1 upward. The same applies to the second projection device 2.

The first projection device 1 has a function of capturing the first projection target OB1. The first projection device 1 transmits an image obtained by capturing the first projection target OB1 to the second projection device 2 via the communication network N. In addition, the second projection device 2 has a function of capturing the second projection target OB2. The second projection device 2 transmits an image obtained by capturing the second projection target OB2 to the first projection device 1 via the communication network N. The first projection device 1 and the second projection device 2 each can clearly share images including the handwritten image and the captured image.

1-2. Configuration of Projection Device

Figure 2:
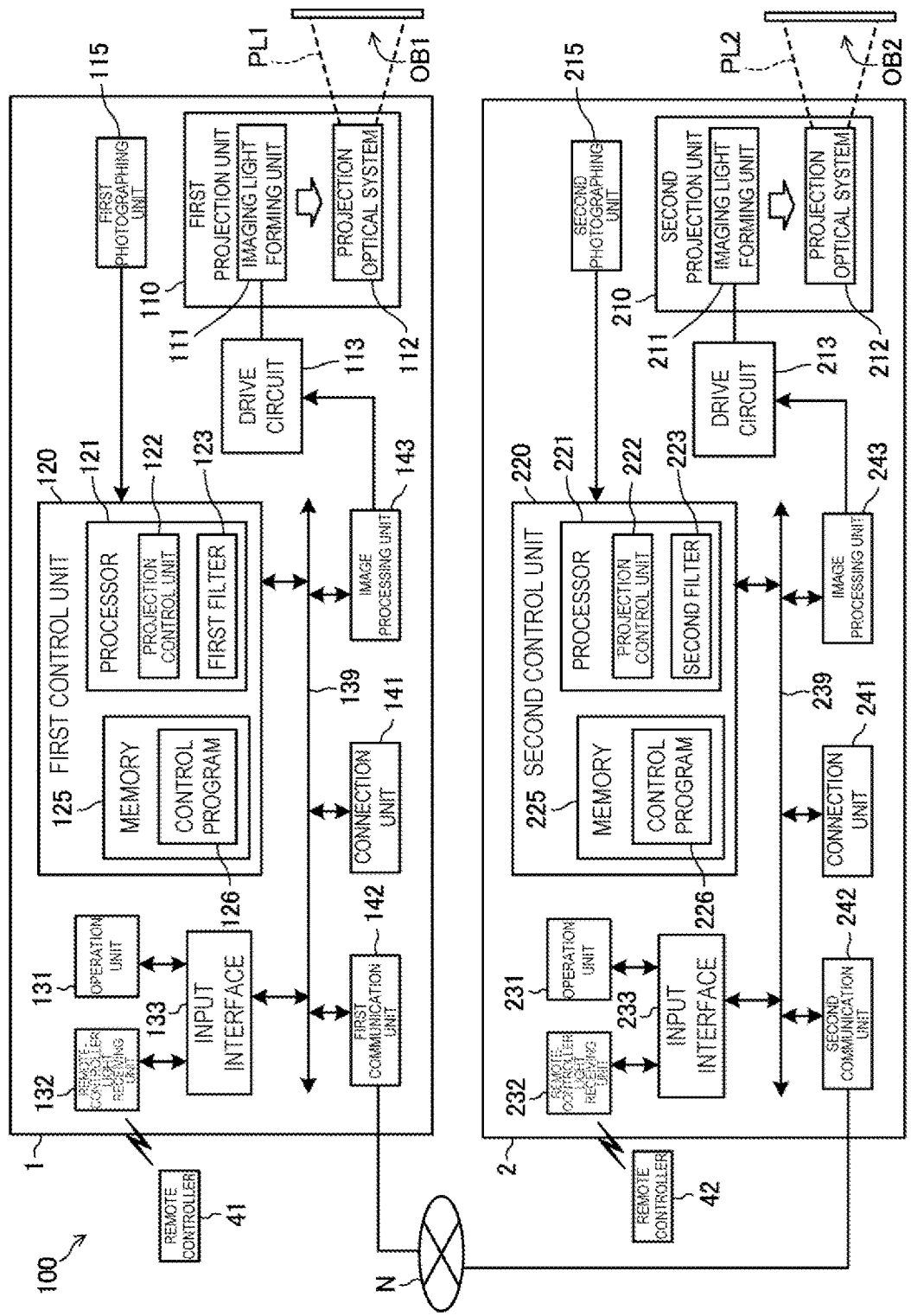
FIG. 2 is a block diagram of respective devices of the projection system according to the first embodiment.

FIG. 2 is a block diagram of respective devices of the projection system 100.

First, a configuration of the first projection device 1 will be described.

The first projection device 1 includes a first projection unit 110 configured to project the imaging light PL1 and a drive circuit 113 configured to drive the first projection unit 110. The first projection unit 110 includes an imaging light forming unit 111 and a projection optical system 112.

The imaging light forming unit 111 generates the imaging light PL1. The imaging light forming unit 111 includes a light emitting element that emits predetermined-colored light. The predetermined-colored light is, for example, red light, blue light, and green light. Examples of the light emitting element include a light emitting diode (LED) element or an organic LED (OLED) element. A configuration of the imaging light forming unit 111 will be described later.

The imaging light forming unit 111 may be configured to include, for example, a lamp or a light source having a solid-state light source, and a light modulator that modulates light emitted by the light source. Examples of the lamp include a halogen lamp, a xenon lamp, or an ultra high-pressure mercury lamp. Examples of the solid-state light source include an LED and a laser light source. Examples of the light modulator include a transmissive liquid crystal panel, a reflective liquid crystal panel, or a digital micro-mirror device (DMD).

The projection optical system 112 includes an optical element that guides the imaging light PL1 emitted by the imaging light forming unit 111 toward the first projection target OB1. The optical element includes one lens or a lens group including a plurality of lenses. The optical element may include a prism and a dichroic mirror. The optical element may also be a reflective optical element such as a mirror.

The drive circuit 113 is coupled to an image processing unit 143 which will be described below. The drive circuit 113 forms the imaging light PL1 by driving the imaging light forming unit 111 based on an image signal input from the image processing unit 143. For example, the drive circuit 113 forms an image in unit of frames with the imaging light forming unit 111.

The first projection device 1 includes a first image-capturing unit 115. The first image-capturing unit 115 is a digital camera including an imaging element. The first image-capturing unit 115 performs capturing in accordance with control by a first control unit 120, which will be described below, and outputs the captured image to the first control unit 120. The capturing range of the first image-capturing unit 115 includes a direction in which the first projection unit 110 projects the imaging light PL1. For example, the capturing range of the first image-capturing unit 115 includes the first projection target OB1. The imaging element included in the first image-capturing unit 115 is, for example, a complementary metal oxide semiconductor (CMOS) image sensor, or a charge coupled device (CCD) image sensor. The configuration of the first image-capturing unit 115 will be described later in conjunction with the first projection unit 110.

The first projection device 1 includes the first control unit 120, an operation unit 131, a remote-controller light receiving unit 132, an input interface 133, a connection unit 141, a first communication unit 142, and an image processing unit 143. The first control unit 120, the input interface 133, the connection unit 141, the first communication unit 142, and the image processing unit 143 are coupled so as to communicate data with each other via a bus 139.

The operation unit 131 includes various buttons and switches provided on the housing surface of the first projection device 1. The operation unit 131 generates an operation signal corresponding to operations of the buttons and the switches, and outputs the operation signal to the input interface 133. The input interface 133 includes a circuit that outputs an operation signal input from the operation unit 131 to the first control unit 120.

The remote-controller light receiving unit 132 includes a light-receiving element that receives infrared light, and receives an infrared signal transmitted from a remote controller 41. The remote controller 41 transmits an infrared signal indicating an operation when a switch, which is not illustrated, included in the remote controller 41 is operated. The remote-controller light receiving unit 132 decodes the received infrared signal and generates an operation signal. The remote-controller light receiving unit 132 outputs the generated operation signal to the input interface 133. The input interface 133 includes a circuit that outputs the operation signal input from the remote-controller light receiving unit 132 to the first control unit 120.

A specific aspect of transmission and reception of signals between the remote controller 41 and the remote-controller light receiving unit 132 is not limited. The configuration in which the remote controller 41 transmits an infrared signal to the remote-controller light receiving unit 132 is an example. For example, a configuration in which the remote controller 41 and the remote-controller light receiving unit 132 transmit and receive signals by executing short-range wireless communication such as Bluetooth may be applied.

The connection unit 141 is an interface device on which image data is received from an external device. The connection unit 141 is coupled to a player or a personal computer that reproduces an optical disc recording medium, for example.

The first communication unit 142 is coupled to the communication network N and transmits/receives data to/from the second projection device 2 via the communication network N. The first communication unit 142 is, for example, a communication device that includes a connector that couples the device to a communication cable, and a communication circuit that inputs and outputs signals using the communication cable. In addition, the first communication unit 142 may be a wireless communication device. In this case, the first communication unit 142 includes, for example, an antenna, a radio frequency (RF) circuit, a baseband circuit, and the like.

The image processing unit 143 selects an image source in accordance with control of the first control unit 120. Sources available for the first projection device 1 are, for example, image data received by the connection unit 141, and image data received by the first communication unit 142.

The image processing unit 143 executes image processing on image data of a selected source in accordance with control of the first control unit 120. Examples of image processing executed by the image processing unit 143 include resolution conversion processing, geometric correction processing, digital zoom processing, image correction processing to adjust the color or brightness of an image, and the like.

The image processing unit 143 generates an image signal based on the image-processed image data, and outputs the image signal to the drive circuit 113. A frame memory, which is not illustrated, may be coupled to the image processing unit 143. In this case, the image processing unit 143 loads the image data acquired from the source in the frame memory. The image processing unit 143 executes image processing on the image data loaded in the frame memory.

The image processing unit 143 can be configured by, for example, an integrated circuit. The integrated circuit is configured by, for example, a large scale integration (LSI). More specifically, the image processing unit 143 is configured by an application specific integrated circuit (ASIC), a programmable logic device (PLD), and the like. The PLD includes, for example, a field programmable gate array (FPGA). Furthermore, the image processing unit 143 may include an analog circuit in a part of the configuration of the integrated circuit, or may be a combination of a processor and an integrated circuit. The combination of a processor and an integrated circuit is called a microcontroller (MCU), a system-on-a-chip (SoC), a system LSI, a chipset, or the like.

The first control unit 120 includes a processor 121 and a memory 125. The memory 125 is a storage device that stores a program executed by the processor 121 and data in a non-volatile manner. The memory 125 is configured by a magnetic storage device, a semiconductor storage element such as a flash read only memory (ROM), or other types of non-volatile storage device. The memory 125 may include a random access memory (RAM) configuring a work area of the processor 121. The memory 125 stores data to be processed by the processor 121 and a control program 126 to be executed by processor 121.

The processor 121 is configured by a central processing unit (CPU), a micro processing unit (MPU), or the like. The processor 121 may be configured by a single processor, or a plurality of processors may function as the processor 121. The processor 121 may be configured by an SoC integrated with some or all of the memory 125 and/or other circuitry. In addition, as described above, the processor 121 may be configured by a combination of a CPU that executes a program and a digital signal processor (DSP) that executes a predetermined arithmetic operation. All of the functions of the processor 121 may be implemented in hardware, or may be configured using a programmable device. The processor 121 may also serve the functions of the image processing unit 143. That is, the functions of the image processing unit 143 may be executed by the processor 121.

The processor 121 controls each unit of the first projection device 1 by executing the control program 126 stored in the memory 125. The processor 121 includes a projection control unit 122 and a first filter 123. Each of these functional units is implemented in cooperation of hardware and software when the processor 121 executes the control program 126.

The projection control unit 122 receives the image transmitted by the second projection device 2 with the first communication unit 142. The image received by the first communication unit 142 from the second projection device 2 is referred to as a first reception image. The projection control unit 122 causes the first projection unit 110 to project an image based on the first reception image to the first projection target OB1. The projection control unit 122 causes the first image-capturing unit 115 to capture a range including the first projection target OB1 to acquire the captured image. The projection control unit 122 uses the first filter 123 to execute filtering on the captured image of the first image-capturing unit 115, and causes the first communication unit 142 to transmit the transmission image generated from the filtering to the second projection device 2. The image captured by the first capturing unit 115 is referred to as a first captured image. In addition, the image generated by filtering the first captured image and then transmitted to the second projection device 2 by the first communication unit 142 is referred to as a first transmission image.

The first filter 123 filters the first captured image based on the first reception image. Specifically, the first filter 123 performs processing of removing the image overlapping the first reception image from the first captured image.

Next, a configuration of the second projection device 2 will be described.

The second projection device 2 includes a second projection unit 210 configured to project the imaging light PL2 and a drive circuit 213 configured to drive the second projection unit 210. The second projection unit 210 includes an imaging light forming unit 211 and a projection optical system 212.

The imaging light forming unit 211 generates the imaging light PL2. The imaging light forming unit 211 includes a light emitting element that emits predetermined-colored light. The light emitting element includes, for example, an LED element, or an OLED element.

The imaging light forming unit 211 may be configured to include, for example, a lamp or a light source having a solid-state light source, and a light modulator that modulates light emitted by the light source. Examples of the light modulator include a transmissive liquid crystal panel, a reflective liquid crystal panel, or a digital micro-mirror device. In addition, the optical element may also be a reflective optical element.

The projection optical system 212 includes an optical element that guides the imaging light PL2 emitted by the imaging light forming unit 211 toward the second projection target OB2. The optical element includes one lens or a lens group including a plurality of lenses. The optical element may include a prism and a dichroic mirror.

The drive circuit 213 is coupled to an image processing unit 243 which will be described below. The drive circuit 213 forms the imaging light PL2 by driving the imaging light forming unit 211 based on an image signal input from the image processing unit 243. For example, the drive circuit 213 forms an image in unit of frames with the imaging light forming unit 211.

The second projection device 2 includes a second image-capturing unit 215. The second image-capturing unit 215 is a digital camera including an imaging element. The second image-capturing unit 215 performs capturing in accordance with control by a second control unit 220, which will be described below, and outputs the captured image to the second control unit 220. The capturing range of the second image-capturing unit 215 includes a direction in which the second projection unit 210 projects the imaging light PL2. For example, the capturing range of the second image-capturing unit 215 includes the second projection target OB2. The imaging element included in the second image-capturing unit 215 is, for example, a CMOS image sensor, or a CCD image sensor.

The configurations of the imaging light forming unit 211, the projection optical system 212, the drive circuit 213, and the second image-capturing unit 215 can each be shared by those of the imaging light forming unit 111, the projection optical system 112, the drive circuit 113, and the first image-capturing unit 115 included in the first projection device 1.

The second projection device 2 includes the second control unit 220, an operation unit 231, a remote-controller light receiving unit 232, an input interface 233, a connection unit 241, a second communication unit 242, and an image processing unit 243. The second control unit 220, the input interface 233, the connection unit 241, the second communication unit 242, and the image processing unit 243 are coupled so as to communicate data with each other via a bus 239.

The operation unit 231 includes various buttons and switches provided on the housing surface of the second projection device 2. The operation unit 231 generates an operation signal corresponding to operations of the buttons and the switches, and outputs the operation signal to the input interface 233. The input interface 233 includes a circuit that outputs an operation signal input from the operation unit 231 to the second control unit 220.

The remote-controller light receiving unit 232 includes a light-receiving element that receives infrared light, and receives an infrared signal transmitted from a remote controller 42. The remote controller 42 transmits an infrared signal indicating an operation when a switch, which is not illustrated, included in the remote controller 42 is operated. The remote-controller light receiving unit 232 decodes the received infrared signal to generate an operation signal. The remote-controller light receiving unit 232 outputs the generated operation signal to the input interface 233. The input interface 233 includes a circuit that outputs the operation signal input from the remote-controller light receiving unit 232 to the second control unit 220.

A specific aspect of transmission and reception of signals between the remote controller 42 and the remote-controller light receiving unit 232 is not limited. The configuration in which the remote controller 42 transmits an infrared signal to the remote-controller light receiving unit 232 is an example. For example, a configuration in which the remote controller 42 and the remote-controller light receiving unit 232 transmit and receive signals by executing short-range wireless communication such as Bluetooth may be applied.

The connection unit 241 is an interface device on which image data is received from an external device. The connection unit 241 is coupled to a player or a personal computer that reproduces an optical disk recording medium, for example.

The second communication unit 242 is coupled to the communication network N and transmits/receives data to/from the first projection device 1 via the communication network N. The second communication unit 242 is, for example, a communication device that includes a connector that couples the device to a communication cable, and a communication circuit that inputs and outputs signals using the communication cable. In addition, the second communication unit 242 may be a wireless communication device. In this case, the second communication unit 242 includes an antenna, an RF circuit, a baseband circuit, and the like, for example.

The image processing unit 243 selects an image source in accordance with control of the second control unit 220. Sources available for the second projection device 2 are, for example, images received by the connection unit 241, and images received by the second communication unit 242.

The image processing unit 243 executes image processing on an image of a selected source in accordance with control of the second control unit 220. Examples of image processing executed by the image processing unit 243 include resolution conversion processing, geometric correction processing, digital zoom processing, image correction processing to adjust the color or brightness of an image, and the like.

The image processing unit 243 generates an image signal based on the image-processed image data, and outputs the image signal to the drive circuit 213. A frame memory, which is not illustrated, may be coupled to the image processing unit 243. In this case, the image processing unit 243 loads the image acquired from the source in the frame memory. The image processing unit 243 executes image processing on the image loaded in the frame memory.

The image processing unit 243 can be configured by, for example, an integrated circuit. The integrated circuit is configured by, for example, an LSI. More specifically, the image processing unit 243 is configured by an ASIC, a PLD, or the like. The PLD includes, for example, an FPGA. Furthermore, the image processing unit may include an analog circuit in a part of the configuration of the integrated circuit, or may be a combination of a processor and an integrated circuit. The combination of the processor and the integrated circuit is, for example, a microcontroller, an SoC, a system LSI, or a chipset.

The configurations of the operation unit 231, the remote-controller light receiving unit 232, and the input interface 233 can each be shared by the operation unit 131, the remote-controller light receiving unit 132, and the input interface 133. Similarly, the configurations of the connection unit 241, the second communication unit 242, and the image processing unit 243 can each be shared by the connection unit 141, the first communication unit 142, and the image processing unit 143.

The second control unit 220 includes a processor 221 and a memory 225. The memory 225 is a storage device that stores a program executed by the processor 221 and data in a non-volatile manner. The memory 225 is configured by a magnetic storage device, a semiconductor storage element such as a flash ROM, or other types of non-volatile storage device. The memory 225 may include a RAM configuring a work area of the processor 221. The memory 225 stores data to be processed by the processor 221 and a control program 226 to be executed by processor 221.

The processor 221 is configured by a CPU, an MPU, or the like. The processor 221 may be configured by a single processor, or a plurality of processors may function as the processor 221. The processor 221 may be configured by an SoC integrated with some or all of the memory 225 and/or other circuitry. In addition, as described above, the processor 221 may be configured by a combination of a CPU that executes a program and a DSP that executes a predetermined arithmetic operation. All of the functions of the processor 221 may be implemented in hardware, or may be configured using a programmable device. The processor 221 may also serve the functions of the image processing unit 243. That is, the functions of the image processing unit 243 may be executed by the processor 221.

The processor 221 controls each unit of the second projection device 2 by executing the control program 226 stored in the memory 225. The processor 221 includes a projection control unit 222 and a second filter 223. These are functional units implemented in cooperation of hardware and software when the processor 221 executes the control program 226.

The projection control unit 222 receives the image transmitted by the first projection device 1 with the second communication unit 242. The image received by the second communication unit 242 from the first projection device 1 is referred to as a second reception image. The projection control unit 222 causes the second projection unit 210 to project an image based on the second reception image to the second projection target OB2. The projection control unit 222 causes the second image-capturing unit 215 to capture a range including the second projection target OB2 to acquire the captured image. The projection control unit 222 uses the second filter 223 to execute filtering on the captured image of the second image-capturing unit 215, and causes the second communication unit 242 to transmit the transmission image generated from the filtering to the first projection device 1. The image captured by the second image-capturing unit 215 is referred to as a second captured image. In addition, the image generated by filtering the second captured image and then transmitted to the first projection device 1 by the second communication unit 242 is referred to as a second transmission image.

The second filter 223 filters the second captured image based on the second reception image. Specifically, the second filter 223 performs processing of removing the image overlapping the second reception image from the second captured image.

1-3. Configuration of Projection Unit and Image-Capturing Unit

Figure 3:
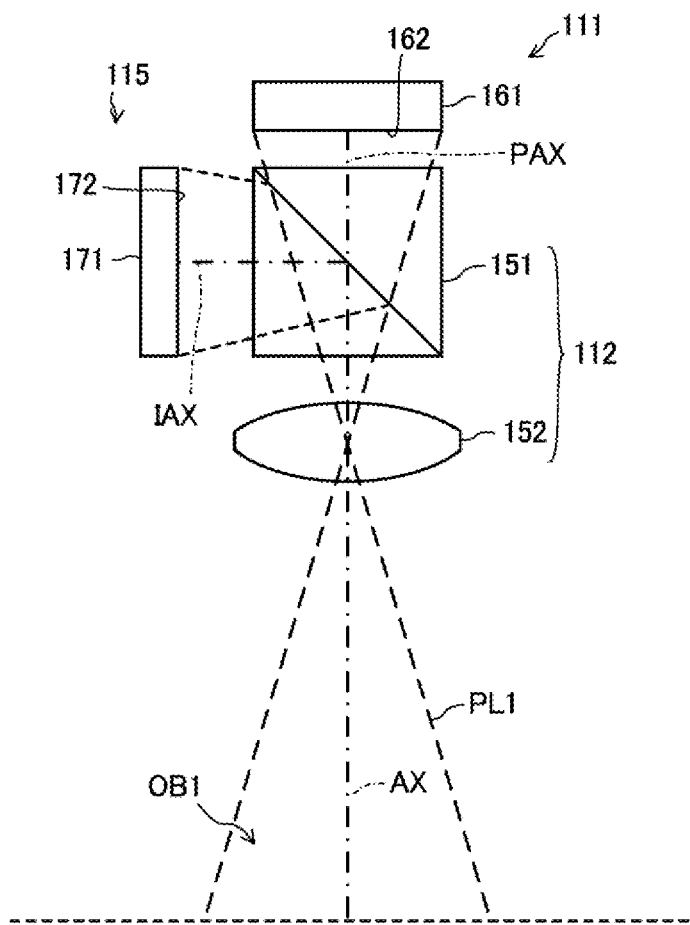
FIG. 3 is a schematic diagram illustrating a configuration example of a projection unit and an image-capturing unit.

FIG. 3 is a schematic diagram illustrating a configuration example of the first projection unit 110 and the first image-capturing unit 115.

The projection optical system 112 includes a separation optical element 151 and a projection lens 152. The optical axis of the imaging light PL1 projected by the projection lens 152 toward the first projection target OB1 is denoted by reference sign AX. The optical axis AX is a central axis of the imaging light PL1 radiated from the projection lens 152 to the first projection target OB1, and is a virtual axis along the direction in which the imaging light PL1 is radiated from the projection lens 152 through the optical center of the projection lens 152.

The imaging light forming unit 111 includes a light-emitting device 161. The light-emitting device 161 has light-emitting elements disposed to be aligned on a light-emitting surface 162. The light-emitting elements disposed on the light-emitting surface 162 includes a light-emitting element that emits red light, a light-emitting element that emits blue light, and a light-emitting element that emits green light. With these light-emitting elements disposed in a matrix shape, the light-emitting device 161 emits the imaging light PL1 from the light-emitting surface 162 to form an image.

The light-emitting surface 162 faces the separation optical element 151. The imaging light PL1 emitted by light-emitting surface 162 is incident on the separation optical element 151 along the optical axis AX, is transmitted through the separation optical element 151, and is incident on the projection lens 152. The projection lens 152 irradiates the first projection target OB1 with the imaging light PL1 transmitted through the separation optical element 151. The optical axis of the imaging light PL1 emitted by the light-emitting surface 162 is referred to as a projection optical axis PAX. The projection optical axis PAX is a central axis of the imaging light PL1 emitted by the light-emitting device 161, and is a virtual axis perpendicular to the light-emitting surface 162 through the center of the region of the light-emitting surface 162 in which the light-emitting elements are disposed. In the configuration of FIG. 3, the projection optical axis PAX coincides with the optical axis AX. In other words, the light-emitting device 161 is disposed on the optical axis AX of the projection optical system 112.

The first image-capturing unit 115 includes an imaging device 171. The imaging device 171 is disposed to face the separation optical element 151. In the imaging device 171, imaging elements are disposed to be aligned on an imaging plane 172 facing the separation optical element 151. The first image-capturing unit 115 performs capturing when each of the imaging elements disposed on the imaging plane 172 receives light incident from the separation optical element 151. The imaging device 171 faces a surface of the separation optical element 151 that is different from the surface that the light-emitting device 161 faces. In more detail, the light-emitting device 161 is arranged to be aligned with the separation optical element 151 in a direction along the optical axis AX. In contrast, the imaging device 171 faces the separation optical element 151 at the angle of 90 degrees with respect to the optical axis AX.

While the separation optical element 151 transmits light emitted by the light-emitting device 161 to cause the light to be incident on the projection lens 152, the separation optical element 151 reflects light incident on itself from the projection lens 152 toward the imaging device 171. The separation optical element 151 can use, for example, a polarization separation element. The separation optical element 151 may be configured by a dichroic mirror or a dichroic prism.

The optical axis of light reflected by the separation optical element 151 toward the imaging device 171 is denoted by reference sign IAX. The image-capturing optical axis IAX is the axis of the center of light from the separation optical element 151 toward the imaging device 171, and the axis of light received by the imaging device 171 on the imaging plane 172. The image-capturing optical axis IAX is a virtual axis perpendicular to the imaging plane 172. In other words, the imaging device 171 is disposed such that the center of the imaging plane 172 coincides with the image-capturing optical axis IAX.

The image-capturing optical axis IAX coincides with the optical axis AX along the way to the point where it is reflected inside the separation optical element 151.

That is, in a region closer to the first projection target OB1 than the projection optical system 112, the projection optical axis PAX of the imaging light PL1 emitted by the imaging light forming unit 111 coincides with the image-capturing optical axis IAX of light received by the first image-capturing unit 115. In this way, the first projection unit 110 and the first image-capturing unit 115 are arranged optically coaxially. That is, the first projection unit 110 and the first image-capturing unit 115 perform projection and capturing of the imaging light PL1 on the same axis.

FIG. 3 is a schematic diagram, and the first projection unit 110, the projection optical system 112, and the first image-capturing unit 115 may include members not illustrated in FIG. 3. For example, the projection optical system 112 may include optical elements that are different from the separation optical element 151 and the projection lens 152. For example, the projection optical system 112 may include a light guide element between the separation optical element 151 and the projection lens 152. A polarization separation element and a polarization conversion element may be provided between the light-emitting device 161 and the separation optical element 151, and polarization of the imaging light PL1 incident on the separation optical element 151 may be adjusted.

Figure 4:
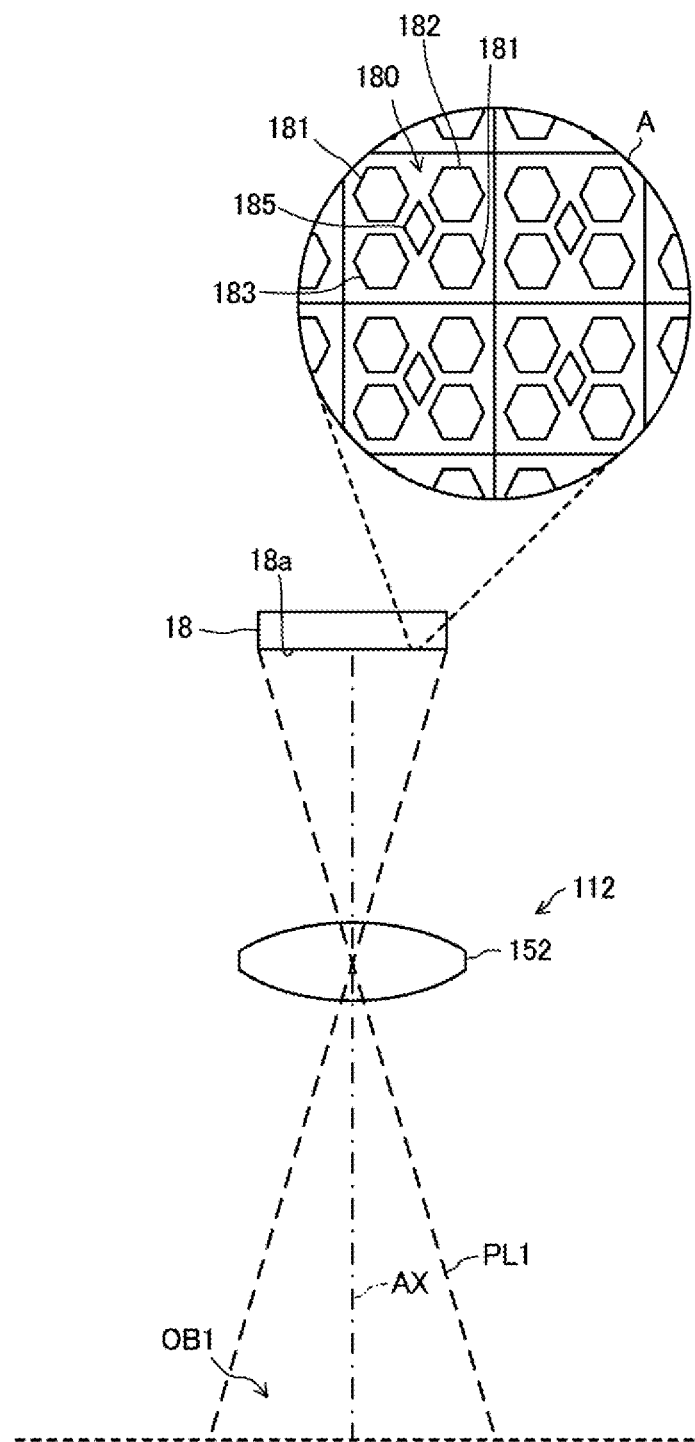
FIG. 4 is a schematic diagram illustrating another configuration example of the projection unit and the image-capturing unit.

FIG. 4 is a schematic diagram illustrating another configuration example of the first projection unit 110 and the first image-capturing unit 115.

This configuration example uses a light receiving/emitting device 18 in which the first projection unit 110 and the first image-capturing unit 115 are integrated. In the example of FIG. 4, the projection optical system 112 does not have the separation optical elements 151. The projection lens 152 in FIG. 4 may be the same as the projection lens 152 illustrated in FIG. 3, or may have a different configuration.

The light receiving/emitting device 18 is disposed on the optical axis AX of the projection lens 152. The light receiving/emitting device 18 includes a light-emitting element and a light-receiving element on a light receiving/emitting surface 18a facing the projection lens 152. In other words, a blue light-emitting element 181, a red light-emitting element 182, a green light-emitting element 183, and an imaging element 185 are disposed on the light receiving/emitting surface 18a, as illustrated in the enlarged circuit A of FIG. 4.

The blue light-emitting element 181, the red light-emitting element 182, and the green light-emitting element 183 are constituted by, for example, an LED or an OLED. The blue light-emitting element 181 is an element that emits light in the blue wavelength range, the red light-emitting element 182 is an element that emits light in the red wavelength range, and the green light-emitting element 183 is an element that emits light in the green wavelength range. In the example illustrated in FIG. 4, one pixel region 180 is configured by two blue light-emitting elements 181, one red light-emitting element 182, and one green light-emitting element 183. The pixel region 180 is a region forming one pixel included in an image formed by the light receiving/emitting device 18. The pixel region 180 forms a color of one pixel with two blue light-emitting elements 181, one red light-emitting element 182, and one green light-emitting element 183.

The light receiving/emitting surface 18a includes one imaging element 185 in the one pixel region 180. The imaging element 185 is an element including a CMOS or a CCD, and receives light incident on the light receiving/emitting surface 18a. The first image-capturing unit 115 receives light with the imaging element 185 to perform capturing.

In this manner, the light receiving/emitting device 18 functions as the imaging light forming unit 111 that forms the imaging light PL1, and the first image-capturing unit 115 that performs capturing. The optical axis of the imaging light PL1 emitted by the light receiving/emitting device 18 is the optical axis AX, and the first image-capturing unit 115 performs capturing with light incident along the optical axis AX. In the configuration illustrated in FIG. 4, similarly to the configuration illustrated in FIG. 3, the first projection unit 110 and the first image-capturing unit 115 are disposed optically coaxially, and the first projection unit 110 and the first image-capturing unit 115 perform projection and capturing on the same axis.

The configuration of the first projection unit 110 and the first image-capturing unit 115 illustrated in FIG. 3 can be applied to the second projection unit 210 and the second image-capturing unit 215. That is, a configuration in which the imaging light forming unit 211 included in the second projection unit 210 includes the light-emitting device 161, the projection optical system 212 includes the separation optical element 151 and the projection lens 152, and the second image-capturing unit 215 includes the imaging device 171 can be adopted. Similarly, the configuration illustrated in FIG. 4 can be applied to the second projection unit 210 and the second image-capturing unit 215. In this case, the second projection unit 210 and the second image-capturing unit 215 can be configured to include the light receiving/emitting device 18 and the projection lens 152 of FIG. 4. According to these configurations, the projection system 100 can function as a system to share images between the first projection device 1 that performs projection and image-capturing on the same axis and the second projection device 2 that performs projection and capturing on the same axis.

1-4. Operation of Projection System

Figure 5:
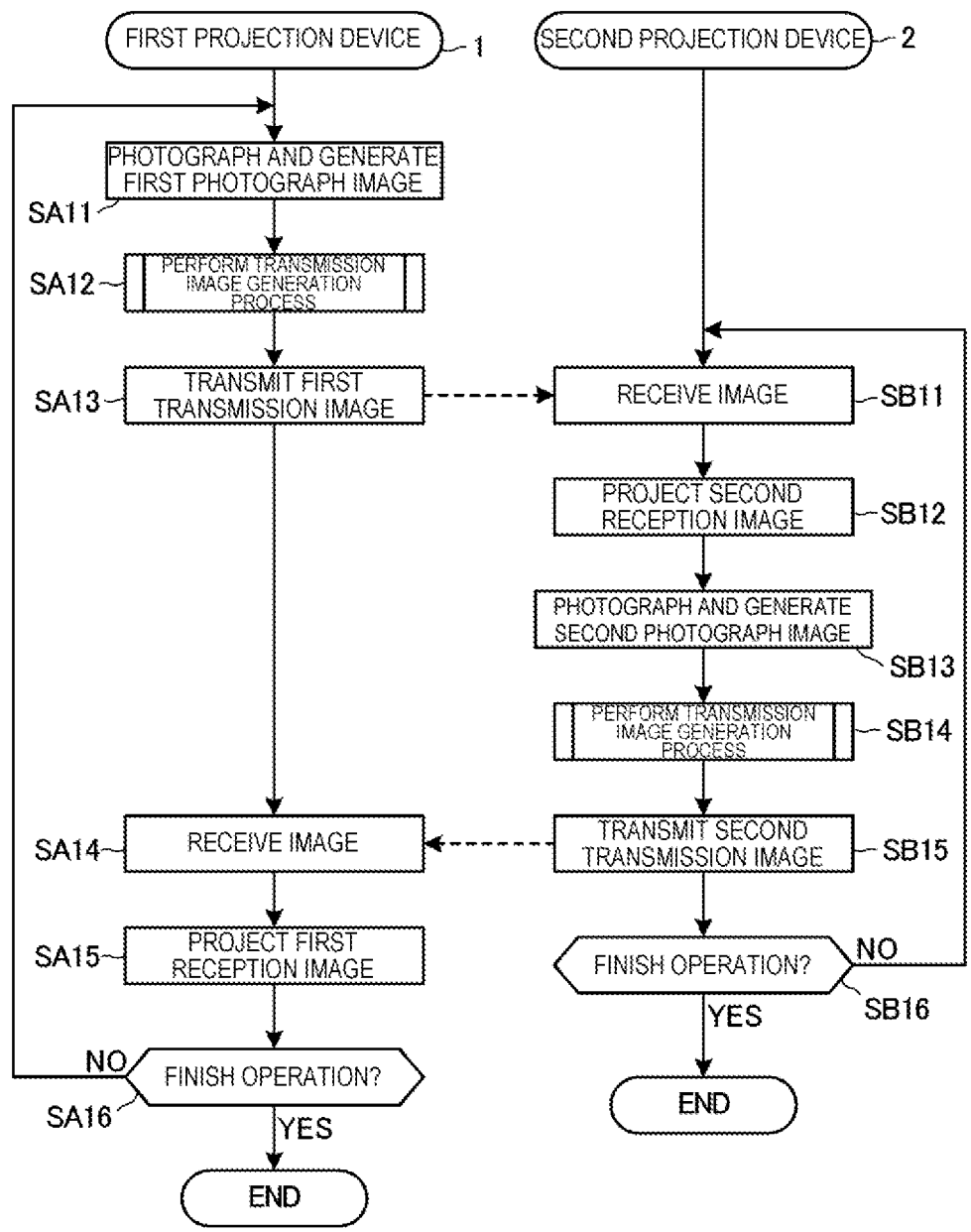
FIG. 5 is a sequence diagram showing an operation of the projection system of the first embodiment.
Figure 6:
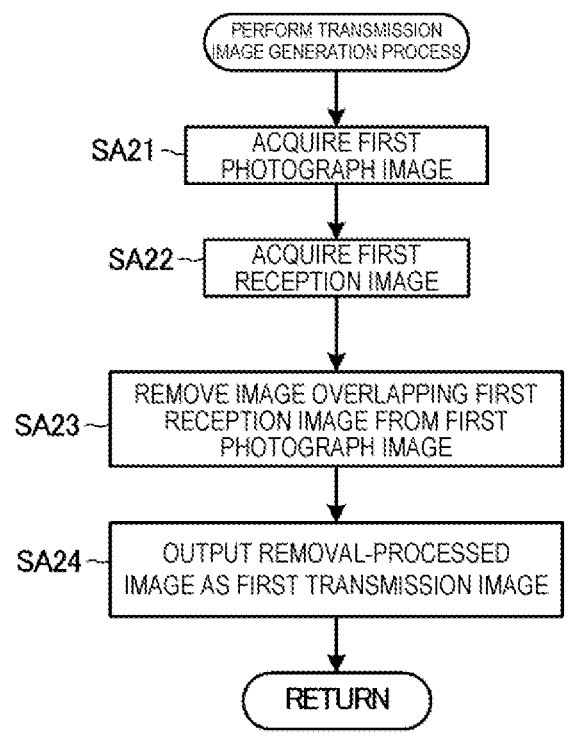
FIG. 6 is a flowchart showing an operation of a first projection device according to the first embodiment.
Figure 7:
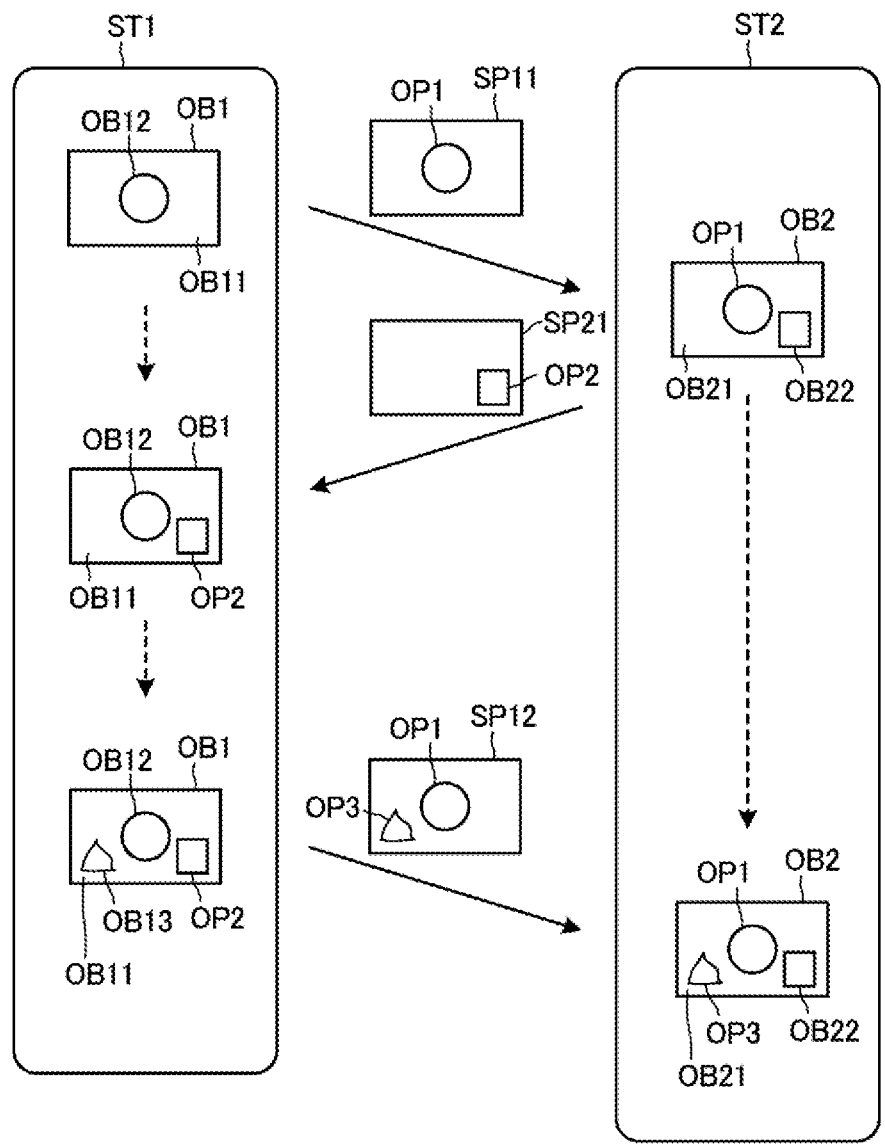
FIG. 7 is a schematic diagram of an operation of the projection system of the first embodiment.

FIG. 5 is a sequence diagram showing an operation of the projection system 100. FIG. 6 is a flowchart showing an operation of a projection device, where the operation of the first projection device 1 is introduced. FIG. 7 is a schematic illustration of an operation of the projection system 100.

Referring to these figures, the operations of the projection system 100 will be described.

In FIG. 5, the processing of steps SA11 to SA16 is executed by the first control unit 120 of the first projection device 1, and the processing of steps SB11 to SB16 is executed by the second control unit 220 of the second projection device 2. Images transmitted and received by the first projection device 1 to and from the second projection device 2 are a first transmission image and a first reception image, respectively. Images transmitted and received by the second projection device 2 to and from the first projection device 1 are a second transmission image and a second reception image, respectively. In addition, images captured by the first projection device 1 and the second projection device 2 are a first captured image and a second captured image, respectively.

In step SA11, the first projection device 1 captures a range including the first projection target OB1, and generates a first captured image. In step SA12, the first projection device 1 executes a transmission image generation process to generate a first transmission image. The transmission image generation process will be described later with reference to FIG. 6. The first projection device 1 transmits the first transmission image to the second projection device 2 in step SA13. For example, this state is represented by the image SP11 of FIG. 7.

In step SB11, the second projection device 2 receives the image transmitted by the first projection device 1. The image received by the second projection device 2 in step SB11 is a second reception image. In step SB12, the second projection device 2 projects the received second reception image onto the second projection target OB2 using the second projection unit 210.

In step SB13, the second projection device 2 captures a range including the second projection target OB2 to generate a second captured image. In step SB14, the second projection device 2 executes the transmission image generation process based on the second captured image to generates a second transmission image that is a processed image. The transmission image generation process performed by the second projection device 2 in step SB14 is a process similar to the process executed by the first projection device 1 in step SA12. In particular, that is a process for generating the second transmission image by using the second captured image instead of the first captured image, and using the second reception image instead of the first reception image. The second projection device 2 transmits the second transmission image to first projection device 1 in step SB15. For example, this state is represented by the image SP21 of FIG. 7.

In step SA14, the first projection device 1 receives the image transmitted by the second projection device 2. The image received by the first projection device 1 in step SA14 is a first reception image. In step SA15, the first projection device 1 projects the received first reception image onto the first projection target OB1 using the first projection unit 110.

The first projection device 1 determines whether the operation is to be ended in step SA16. If it is determined that the operation is to be ended (step SA16; YES), such as in a case in which the operation instructing the end of the operation is detected by the input interface 133, the first projection device 1 ends the present process. If it is determined that the operation is not to be ended (step SA16; NO), the first projection device 1 returns to step SA11.

The second projection device 2 determines whether the operation is to be ended in step SB16. If it is determined that the operation is to be ended (step SB16; YES), such as in a case in which the operation instructing the end of the operation is detected by the input interface 233, the second projection device 2 ends the present process. If it is determined that the operation is not to be ended (step SB16; NO), the second projection device 2 returns to step SB11.

FIG. 6 details the transmission image generation process executed by the first projection device 1 in step SA12. The processes of step SA21 to SA24 in FIG. 6 are executed by the first control unit 120.

In step SA21, the first projection device 1 acquires the first captured image captured by the first image-capturing unit 115. In step SA22, the first reception image received before step SA21 is acquired. For example, in the transmission image generation process in which steps SA11 to SA16 illustrated in FIG. 5 are executed in the second round, the first projection device 1 acquires the first reception image that has been received in step SA14 executed in the first round of the process.

In step SA23, the first projection device 1 removes the image overlapping the first reception image acquired in step SA22 from the first captured image acquired in step SA21. In step SA23, the first projection device 1 filters the first captured image acquired in step SA21 using the first filter 123, for example. The first filter 123 outputs the image obtained by removing the image overlapping the first reception image from the first captured image by filtering the first captured image based on the first reception image. In step SA24, the first projection device 1 stores, as the first transmission image, the processed image that has undergone the processing to remove the image in the memory 125. For example, the first projection device 1 uses the image output by the first filter 123 as the first transmission image in step SA24. The first transmission image stored in the memory 125 in step SA24 is transmitted to the second projection device 2 in step SA13, as described above.

Here, the first filter 123 causes, for example, the first reception image to overlap the first captured image, and removes and outputs the image overlapping the first reception image and the first captured image.

The image included in the first captured image overlapping the first reception image includes an image that completely matches in size, position, and shape of the image. Furthermore, the first filter 123 may remove an image that differ in any of size, position, and shape of the image from the image included in first reception image from the first captured image. In this case, the first control unit 120 may have a threshold for defining an acceptable range for the difference in size, position, and shape of the image. For example, if the amount of the difference in size, position, and shape of the image is smaller than the threshold, it may be determined that the image overlaps. In addition, the first filter 123 may perform processing for removing the image based on whether the colors of the images match.

Further, for example, the first filter 123 may recognize the image object included in the first reception image and the image object included in the first captured image, and process the first captured image. The image objects refer to a group of images such as figures and characters. Specifically, the first filter 123 removes the background from the first reception image and extracts the image object included in the image from which the background has been removed. The first filter 123 removes the background from the first captured image and extracts the image object included in the image from which the background has been removed. The first filter 123 compares the image object extracted from the first reception image to the image object extracted from the first captured image, and identifies the matching image object. The first filter 123 removes the identified image object from the first captured image. For example, this state is represented by the image SP12 of FIG. 7.

The second projection device 2 executes processing similar to the transmission image generation process illustrated in FIG. 6 in step SB14. That is, the second projection device 2 acquires the second captured image captured by the second image-capturing unit 215 in step SB14, and acquires the second reception image received in step SB11. The second projection device 2 executes filtering by using, for example, the second filter 223 to removes an image overlapping the second reception image from the second captured image. The second projection device 2 stores the image processed by the second filter 223 in the memory 225 as a processed image. The processed image stored in the memory 225 is transmitted to the first projection device 1 in step SB15 as a second transmission image.

In this manner, the first projection device 1 transmits, to the second projection device 2, the first transmission image obtained by removing the image overlapping the first reception image from the first captured image. Similarly, the second projection device 2 transmits, to the first projection device 1, the second transmission image, which is a processed image obtained by removing an image overlapping the second reception image from the second captured image. These processes provide the effect of improving the visibility of the projection images projected on the first projection target OB1 and the second projection target OB2.

FIG. 7 illustrates a visual recognition state ST1 of the first projection target OB1 of the first projection device 1, and a visual recognition state ST2 of the second projection target OB2 of the second projection device 2. Furthermore, images SP11, SP21, and SP12 transmitted and received between the first projection device 1 and the second projection device 2 are illustrated.

An object OB12 is placed in the plane OB11 in the first projection target OB1 of the first projection device 1 as illustrated in FIG. 1. This visual recognition state is seen as in the upper section of ST1 in FIG. 7, and the real object OB12 is visually recognized. In addition, paper or the like is placed on the plane OB11, and a user using the first projection device 1 can write characters or figures on the plane OB11 using a writing instrument.

An object OB22 is placed on the plane OB21 on the second projection target OB2 of the second projection device 2. This state is not illustrated in FIG. 7. In addition, paper or the like is placed on the plane OB21 similarly to the plane OB11, and a user using the second projection device 2 can write characters or figures on the plane OB21 using a writing instrument.

The first projection device 1 captures the first projection target OB1 using the first image-capturing unit 115 to generate a first captured image. The first captured image includes an object image OP1 that is an image of the object OB12. The first projection device 1 generates a first transmission image by performing filtering on the first captured image with the first filter 123. The first projection device 1 transmits the first transmission image as an image SP11 to the second projection device 2. This state is represented by the image SP11 in FIG. 7.

The second projection device 2 receives the image SP11 as a second reception image. The second projection device 2 projects the second reception image onto the second projection target OB2 using the second projection unit 210. At this time, an object OB22 is present in the second projection target OB2, and the object image OP1 is projected. This visual recognition state is seen as in the upper section of ST2 in FIG. 7, and the real object OB22 and the object image OP1 being a projection image of the object OB12 are visually recognized.

The second projection device 2 captures the second projection target OB2 using the second image-capturing unit 215 to generate a second captured image. In the second captured image, the object image OP2, which is an image of the object OB22, and the object image OP1 are formed. The second projection device 2 generates a processing image by removing the image overlapping the first transmission image from the second captured image. The processed image is the image obtained by removing the object image OP1 from the second captured image. The second projection device 2 transmits the second transmission image, which is the processed image, to the first projection device 1 as an image SP21. This state is represented by the image SP21 in FIG. 7.

The first projection device 1 receives the image SP21 as a first reception image. The first projection device 1 projects the first reception image onto the first projection target OB1 using the first projection unit 110. Thus, the object OB12 and the object image OP2 are visually recognized in the first projection target OB1. This visual recognition state is seen as in the middle section of ST1 in FIG. 7, and the real object OB12 and the object image OP2 being a projection image of the object OB22 are visually recognized.

Here, an example in which the user of the first projection device 1 writes a handwritten figure OB13 on the plane OB11 will be introduced. The handwritten figure OB13 is visually recognized in the first projection target OB1, in addition to the object OB12 and the object image OP2. This visual recognition state is seen as in the lower section of ST1 in FIG. 7, and the real object OB12, the handwritten figure OB13, and the object image OP2 being a projection image of the object OB22 are visually recognized.

The first projection device 1 captures the first projection target OB1 using the first image-capturing unit 115 to generate a first captured image. The first captured image includes an image of the object OB12, an image of the handwritten figure OB13, and an image of the object image OP2. The first projection device 1 removes an image overlapping an image SP21 from the first captured image using the first filter 123. Accordingly, the first projection device 1 generates a first transmission image. The first transmission image includes an object image OP1, which is an image of the object OB12, and an object image OP3 that is an image of the handwritten figure OB13, and does not include the object image OP2. The first projection device 1 transmits the first transmission image as an image SP12 to the second projection device 2. This state is represented by the image SP12 in FIG. 7.

The second projection device 2 receives the image SP12 as a second reception image and projects the second reception image SP12 onto the second projection target OB2 using the second projection unit 210. Thus, in the second projection target OB2, an object OB22, the object image OP1 and the object image OP3 projected by the second projection unit 210 are visually recognized. The visual recognition state is illustrated as in the lower stage of ST2 in FIG. 7, and the real object OB22, the object image OP1, which is a projection image of the object OB12, and an object image OP3, which is a projection image of the figure OB13, are visually recognized.

In this manner, in the projection system 100, the images of the object OB12 and the handwritten figure OB13 installed in the first projection target OB1 are projected in the second projection target OB2. In addition, the image of the object OB22 installed in the second projection target OB2 is projected on the first projection target OB1. Thus, the states of the first projection target OB1 and the second projection target OB2 can be shared between the first projection device 1 and the second projection device 2.

In addition, the first transmission image transmitted by the first projection device 1 to the second projection device 2 is the image obtained by removing the image overlapping the first reception image received by the first projection device 1 from the first captured image by the first image-capturing unit 115. Furthermore, the second projection device 2 transmits, to the first projection device 1, the second transmission image obtained by removing the image overlapping the second reception image from the second captured image by the second image-capturing unit 215. This has the advantage of ensuring good visibility of the first projection target OB1 and the second projection target OB2.

As a comparison, it is assumed that, in the example illustrated in FIG. 7, the second projection device 2 transmits a second captured image of the second image-capturing unit 215 to the first projection device 1 as is. In this case, when the first projection device 1 projects the second projection image transmitted by the second projection device 2 on the first projection target OB1, the object image OP1 is projected to overlap on the object OB12. The object image OP1 does not have to fully match the object OB12. For example, the object image OP1 included in the first captured image of the first image-capturing unit 115 is affected by irregularity in brightness of the plane OB11 due to ambient light, a shadow of the object OB22 generated by ambient light, the color of the plane OB11, convexities and concavities of the plane OB1, and the like. Furthermore, when the object image OP1 is projected into the second projection target OB2 by the second projection unit 210, the second captured image obtained by the second image-capturing unit 215 capturing the projected object image OP1 is highly likely to be different from the real object OB12. Thus, when the second captured image of the second image-capturing unit 215 is projected into the first projection target OB1 by the first projection unit 110, the object image OP1 that is close to the appearance of the object OB12 and different from the appearance of the object OB12 is projected at the position overlapping the object OB12. It can be said that the user has poor visibility in this state compared to when only the object OB12 is visually recognized.

In particular, when a configuration in which the projection optical axis PAX of the first projection unit 110 and the image-capturing optical axis IAX of the first image-capturing unit 115 are the same axis, that is, coaxial, is employed as illustrated in FIGS. 3 and 4, the object image OP1 and the appearance of the object OB12 have high similarity in position and size. Thus, since the line composing the object image OP1 overlaps with the object OB12, a double image will be visible to the user. This state is less visible to the user, and thus it is hard to say that the user can have comfortable visibility in the state.

In the projection system 100 according to the present embodiment, the first projection device 1 transmits the first transmission image generated in the transmission image generation process to the second projection device 2, and the second projection device 2 transmits the second transmission image, which is a processed image generated in the transmission image generation process, to the first projection device 1. Thus, the states of the first projection target OB1 and the second projection target OB2 can be shared between the first projection device 1 and the second projection device 2 in favorable visibility.

1-5. Effects of Embodiments

The projection system 100 described in the embodiment includes the first projection device 1 and the second projection device 2 as explained above. The first projection device 1 includes the first communication unit 142 that communicates with the second projection device 2 to receive a first reception image, the first projection unit 110 that projects the first reception image onto the first projection target OB1, and the first image-capturing unit 115 that captures a range including the first projection target OB1. The first projection device 1 generates a first transmission image by removing an image overlapping the first reception image from the captured image captured by the first image-capturing unit 115, and transmits the first transmission image by using the first communication unit 142. The second projection device 2 includes the second communication unit 242 that communicates with the first projection device 1 to receive a second reception image, the second projection unit 210 that projects the second reception image onto the second projection target OB2, and the second image-capturing unit 215 that captures a range including the second projection target OB2. The second projection device 2 generates a second transmission image by removing an image overlapping the second reception image from the captured image captured by the second image-capturing unit 215, and transmits the second transmission image by using the second communication unit 242.

A control method of the projection system 100 is, by using the first projection device 1, communicating with the second projection device 2 to receive a first reception image, projecting the first reception image onto the first projection target OB1, and capturing a range including the first projection target OB1. Further, by the first projection device 1, the first transmission image is generated by removing the image overlapping the first reception image from the first capture image obtained by capturing the first projection target OB1, and the first transmission image is transmitted to the second projection device 2. In addition, by the second projection device 2 communication with the first projection device 1 is performed to receive a second reception image, a second reception image is projected onto the second projection target OB2, and a range including the second projection target OB2 is captured. Further, by the second projection device 2, the second transmission image is generated by removing an image overlapping the second reception image from the second captured image obtained by capturing the second projection target OB2, and the second transmission image is transmitted to the first projection device 1.

According to the projection system 100 and the control method of the projection system 100, the state of the first projection target OB1 and the state of the second projection target OB2 can be shared by the first projection device 1 and the second projection device 2. Furthermore, a state in which a projection image projected by the first projection device 1 onto the first projection target OB1 unnaturally overlaps with the real first projection target OB1 can be prevented. Likewise, a state in which a projection image projected by the second projection device 2 onto the second projection target OB2 unnaturally overlaps with the real second projection target OB2 can be prevented. As a result, the user can visually recognize the first projection target OB1 and the second projection target OB2 with good visibility.

The first projection device 1 generates the first transmission image by removing an image overlapping the first reception image from the captured image of the first image-capturing unit 115 by using the first filter 123. Thus, the processing performed by using the first filter 123 makes it possible to prevent the projection image projected from the second projection device 2 on the second projection target OB2 from unnaturally overlapping on the real second projection target OB2.

The second projection device 2 generates the second transmission image by removing an image overlapping the second reception image from the captured image of the second image-capturing unit 215 by using the second filter 223. Thus, the processing performed by using the second filter 223 makes it possible to prevent the projection image projected from the first projection device 1 on the first projection target OB1 from unnaturally overlapping on the real first projection target OB1.

The first projection unit 110 includes the imaging light forming unit 111 that forms imaging light and the projection optical system 112 that projects the imaging light toward the first projection target OB1, and the first image-capturing unit 115 includes an imaging device 171 that receives light incident through the projection optical system. In addition, the first image-capturing unit 115 may be configured to include the light receiving/emitting device 18.

Then, the first projection device 1 can be configured such that the projection optical axis PAX of the imaging light PL1 and the optical axis AX of the first image-capturing unit 115 of the first projection device 1 overlap on the optical axis AX. According to this configuration, a captured image slightly shifted from a projection image PP1 projected by the first projection unit 110 can be obtained by the first image-capturing unit 115.

2. Second Embodiment

Figure 8:
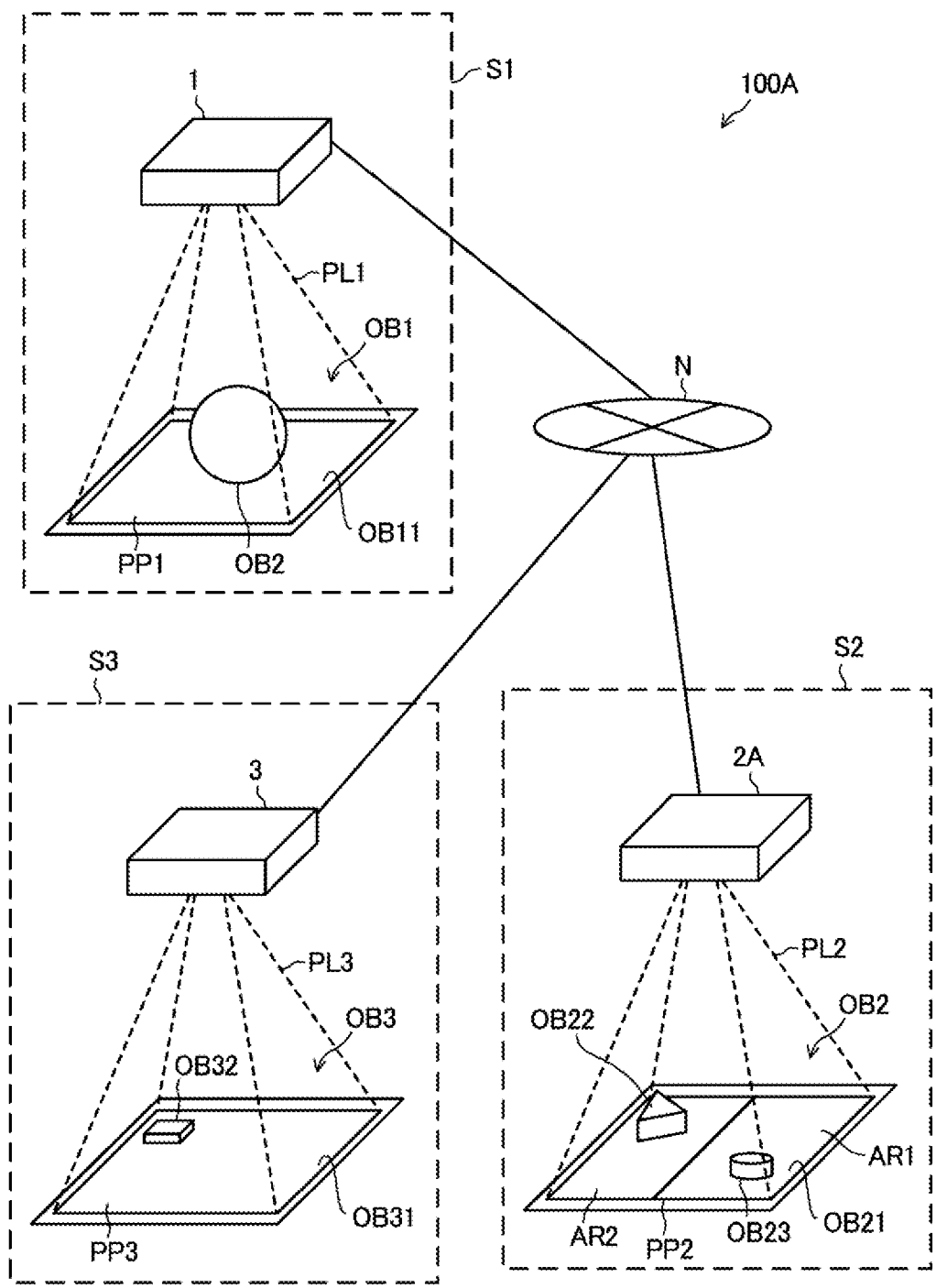
FIG. 8 is a diagram illustrating a schematic configuration of a projection system according to a second embodiment.
Figure 9:
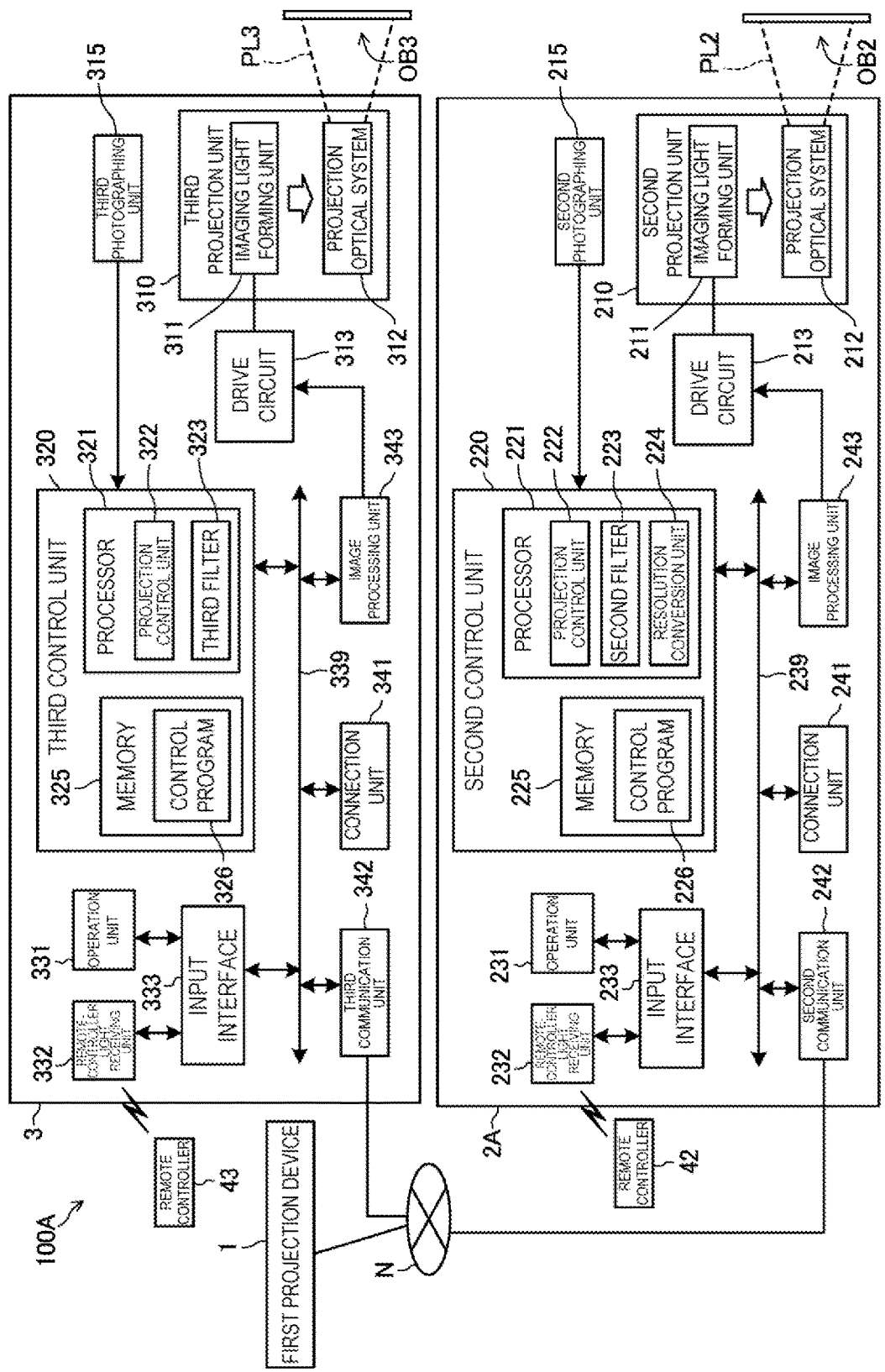
FIG. 9 is a block diagram of respective devices of the projection system according to the second embodiment.
Figure 10:
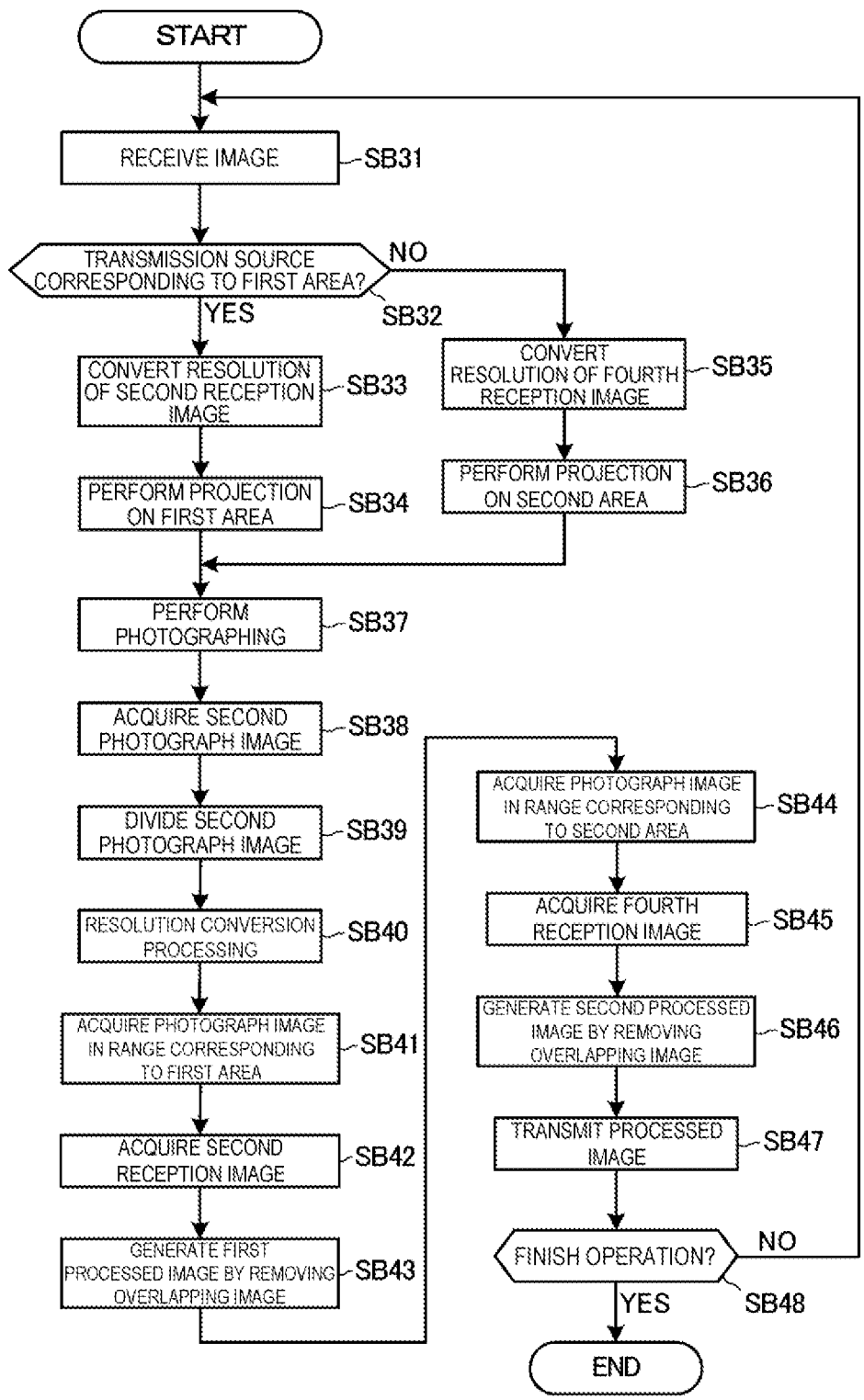
FIG. 10 is a flowchart showing an operation of a second projection device according to the second embodiment.
Figure 11:
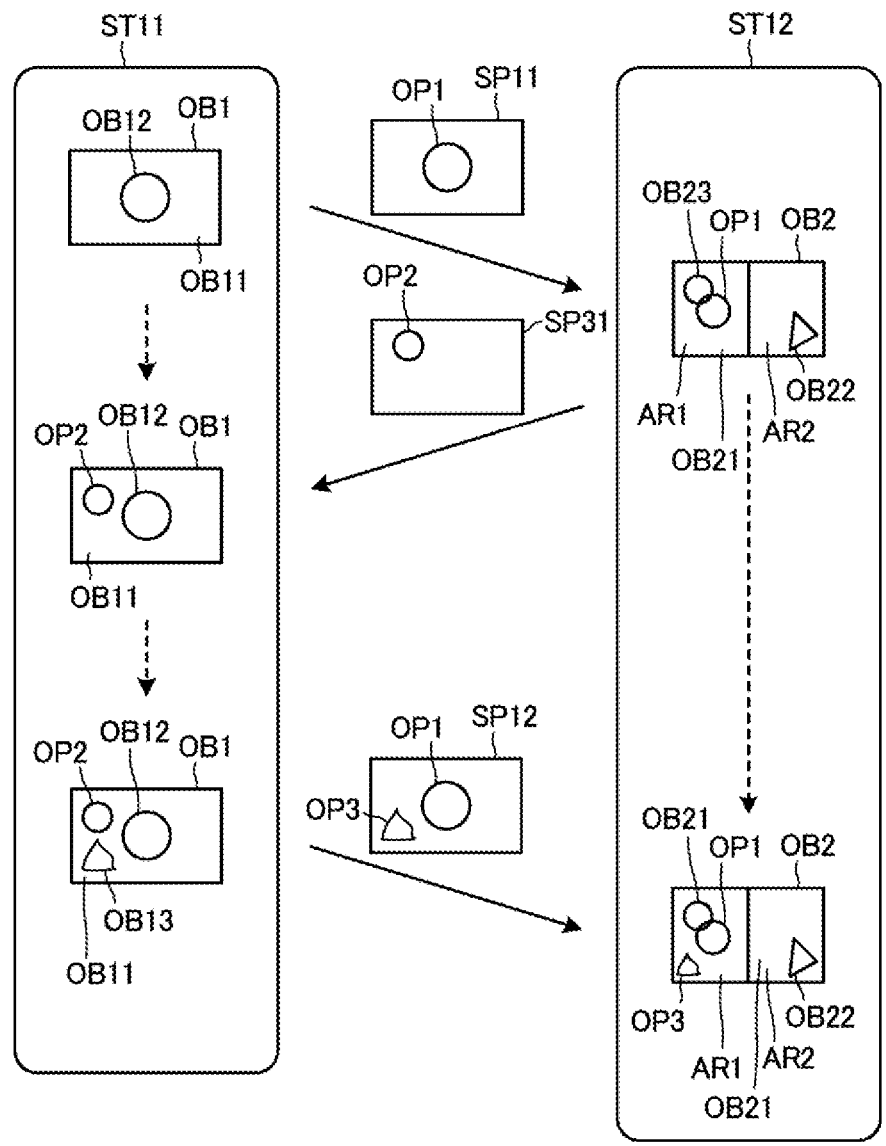
FIG. 11 is a schematic diagram of an operation of the projection system of the second embodiment.

FIG. 8 is a diagram illustrating a schematic configuration of a projection system 100A according to a second embodiment. FIG. 9 is a block diagram of respective devices of the projection system 100A according to the second embodiment. FIG. 10 is a flowchart showing an operation of a second projection device 2A according to the second embodiment. FIG. 11 is a schematic diagram of an operation of the projection system 100A of the second embodiment. The second embodiment will be described with reference to the diagrams. In the description of the second embodiment, configurations of the projection system 100A common to the first embodiment will be denoted by the same reference numerals, and descriptions thereof will be omitted.

The projection system 100A illustrated in FIG. 8 includes a first projection device 1, a second projection device 2A, and a third projection device 3. The first projection device 1, the second projection device 2A, and the third projection device 3 are communicatively connected to each other via a communication network N.

There is no restriction on the installation locations of the first projection device 1, the second projection device 2A, and the third projection device 3. For example, a use location S1 of the first projection device 1, a use location S2 of the second projection device 2A, and a use location S3 of the third projection device 3 may be separated or in proximity.

The second projection device 2A has a configuration common to the second projection device 2 described in the first embodiment. In the second embodiment, an object OB22 and an object OB23 are installed in a second projection target OB2.

The third projection device 3 is a projection device configured similarly to the first projection device 1. The third projection device 3 projects imaging light PL3 toward a third projection target OB3 to form a projection image PP3 on the third projection target OB3. Projecting the imaging light PL3 by the third projection device 3 corresponds to displaying the projection image PP3 on the third projection target OB3.

Although FIG. 8 illustrates a configuration in which the third projection device 3 is installed above the third projection target OB3, and the imaging light PL3 is projected downward from the third projection device 3, this configuration is merely an example. The installation condition of the third projection device 3 and the configuration of the third projection target OB3 can be freely changed in the same manner as in the installation condition of the first projection device 1 and the configuration of the first projection target OB1 described in the first embodiment.

The third projection device 3 has a function of capturing the third projection target OB3. The third projection device 3 transmits, as a third transmission image, a third captured image obtained by capturing the third projection target OB3 to the second projection device 2A via the communication network N. Furthermore, an image from the second projection device 2A is received as a third reception image.

The second projection device 2A has a function of capturing the second projection target OB2. The second projection device 2A transmits, via the communication network N, a second captured image obtained by capturing the second projection target OB2 as a second transmission image to the first projection device 1 and as a fourth transmission image to the third projection device 3. The second projection device 2A receives an image from the first projection device 1 as a second reception image, and receives an image from the third projection device 3 as a fourth reception image.

As illustrated in FIG. 9, the second projection device 2A differs from the second projection device 2 in that the second control unit 220 includes a resolution conversion unit 224 and performs processing using the resolution conversion unit 224. With respect to the second projection device 2A, configuration parts and operations shared by the second projection device 2 will be omitted.

The third projection device 3 includes a third projection unit 310 configured to project the imaging light PL3 and a drive circuit 313 configured to drive the third projection unit 310. The third projection unit 310 includes an imaging light forming unit 311 and a projection optical system 312.

The imaging light forming unit 311 generates the imaging light PL3. The imaging light forming unit 311 includes a light emitting element that emits predetermined-colored light. The light emitting element includes, for example, an LED element, or an OLED element.

The imaging light forming unit 311 may be configured to include, for example, a lamp or a light source having a solid-state light source, and a light modulator that modulates light emitted by the light source. Examples of the lamp include a halogen lamp, a xenon lamp, or an ultra high-pressure mercury lamp. Examples of the solid-state light source include an LED and a laser light source. Examples of the light modulator include a transmissive liquid crystal panel, a reflective liquid crystal panel, or a digital micromirror device.

The projection optical system 312 includes an optical element that guides the imaging light PL3 emitted by the imaging light forming unit 311 toward the third projection target OB3. The optical element includes one lens or a lens group including a plurality of lenses. The optical element may include a prism and a dichroic mirror.

The drive circuit 313 is coupled to an image processing unit 343 which will be described below. The drive circuit 313 forms the imaging light PL3 by driving the imaging light forming unit 311 based on an image signal input from the image processing unit 343. For example, the drive circuit 313 forms an image in unit of frames with the imaging light forming unit 311.

The third projection device 3 includes a third image-capturing unit 315. The third image-capturing unit 315 is a digital camera including an imaging element. The third image-capturing unit 315 performs capturing in accordance with control by a third control unit 320, which will be described below, and outputs the captured image to the third control unit 320. The capturing range of the third image-capturing unit 315 includes a direction in which the third projection unit 310 projects the imaging light PL3. For example, the capturing range of the third image-capturing unit 315 includes the third projection target OB3. The imaging element included in the third image-capturing unit 315 is, for example, a CMOS image sensor, or a CCD image sensor.

The configurations of the imaging light forming unit 311, the projection optical system 312, the drive circuit 313, and the third image-capturing unit 315 can each be shared by the imaging light forming unit 111, the projection optical system 112, the drive circuit 113, and the first image-capturing unit 115 included in the first projection device 1.

The third projection device 3 includes the third control unit 320, an operation unit 331, a remote-controller light receiving unit 332, an input interface 333, a connection unit 341, a third communication unit 342, and an image processing unit 343. The third control unit 320, the input interface 333, the connection unit 341, the third communication unit 342, and the image processing unit 343 are coupled to communicate data with each other via a bus 339.

The operation unit 331 includes various buttons and switches provided on the housing surface of the third projection device 3. The operation unit 331 generates an operation signal corresponding to operations of the buttons and the switches, and outputs the operation signal to the input interface 333. The input interface 333 includes a circuit that outputs an operation signal input from the operation unit 331 to the third control unit 320.

The remote-controller light receiving unit 332 includes a light-receiving element that receives infrared light, and receives an infrared signal transmitted from a remote controller 43. The remote controller 43 transmits an infrared signal indicating an operation when a switch, which is not illustrated, included in the remote controller 43 is operated. The remote-controller light receiving unit 332 decodes the received infrared signal to generate an operation signal. The remote-controller light receiving unit 332 outputs the generated operation signal to the input interface 333. The input interface 333 includes a circuit that outputs the operation signal input from the remote-controller light receiving unit 332 to the third control unit 320.

A specific aspect of transmission and reception of signals between the remote controller 43 and the remote-controller light receiving unit 332 is not limited. The configuration in which the remote controller 43 transmits an infrared signal to the remote-controller light receiving unit 332 is an example. For example, a configuration in which the remote controller 43 and the remote-controller light receiving unit 332 transmit and receive signals by executing short-range wireless communication such as Bluetooth may be applied.

The connection unit 341 is an interface device on which an image is received from an external device. The connection unit 341 is coupled to a player or a personal computer that reproduces an optical disk recording medium, for example.

The third communication unit 342 is coupled to the communication network N and transmits/receives data to/from the second projection device 2A via the communication network N. The third communication unit 342 is, for example, a communication device that includes a connector that couples the device to a communication cable, and a communication circuit that inputs and outputs signals using the communication cable. In addition, the third communication unit 342 may be a wireless communication device. In this case, the third communication unit 342 includes an antenna, an RF circuit, a baseband circuit, and the like, for example.

The image processing unit 343 selects an image source in accordance with control of the third control unit 320. Sources available for the third projection device 3 are, for example, image data received by the connection unit 341, and image data received by the third communication unit 342.

The image processing unit 343 executes image processing on an image of a selected source in accordance with control of the third control unit 320. Examples of image processing executed by the image processing unit 343 include resolution conversion processing, geometric correction processing, digital zoom processing, image correction processing to adjust the color or brightness of an image, and the like.

The image processing unit 343 generates an image signal based on the processed image, and outputs the image signal to the drive circuit 313. A frame memory, which is not illustrated, may be coupled to the image processing unit 343. In this case, the image processing unit 343 loads the image data acquired from the source in the frame memory. The image processing unit 343 executes image processing on the image data loaded in the frame memory.

The image processing unit 343 can be configured by, for example, an integrated circuit. The integrated circuit is configured by, for example, an LSI. More specifically, the image processing unit 343 is configured by an ASIC, a PLD, or the like. The PLD includes, for example, an FPGA. Furthermore, the image processing unit may include an analog circuit in a part of the configuration of the integrated circuit, or may be a combination of a processor and an integrated circuit. The combination of the processor and the integrated circuit is, for example, a microcontroller, an SoC, a system LSI, or a chipset.

The configurations of the operation unit 331, the remote-controller light receiving unit 332, and the input interface 333 can each be shared by the operation unit 131, the remote-controller light receiving unit 132, and the input interface 133. Similarly, the configurations of the connection unit 341, the third communication unit 342, and the image processing unit 343 can each be shared by the connection unit 141, the first communication unit 142, and the image processing unit 143.

The third projection unit 310 and the third image-capturing unit 315 included in the third projection device 3 can adopt the configuration illustrated in FIG. 3 and the configuration illustrated in FIG. 4. That is, a configuration in which the imaging light forming unit 311 included in the third projection unit 310 includes the light-emitting device 161, the projection optical system 312 includes the separation optical element 151 and the projection lens 152, and the third image-capturing unit 315 includes the imaging device 171 can be adopted. Similarly, the configuration illustrated in FIG. 4 can be applied to the third projection unit 310 and the third image-capturing unit 315. In this case, the third projection unit 310 and the third image-capturing unit 315 can be configured to include the light receiving/emitting device 18 and the projection lens 152 of FIG. 4. The first projection device 1, the second projection device 2A, and the third projection device 3 constituting the projection system 100A function as projection devices that perform projection and capturing on the same axis.

The third control unit 320 includes a processor 321 and a memory 325. The memory 325 is a storage device that stores a program executed by the processor 321 and data in a non-volatile manner. The memory 325 is configured by a magnetic storage device, a semiconductor storage element such as a flash ROM, or other types of non-volatile storage device. The memory 325 may include a RAM configuring a work area of the processor 321. The memory 325 stores data to be processed by the processor 321 and a control program 326 to be executed by processor 321.

The processor 321 is configured by a CPU, an MPU, or the like. The processor 321 may be configured by a single processor, or a plurality of processors may function as the processor 321. The processor 321 may be configured by an SoC integrated with some or all of the memory 325 and/or other circuitry. In addition, as described above, the processor 321 may be configured by a combination of a CPU that executes a program and a DSP that executes a predetermined arithmetic operation. All of the functions of the processor 321 may be implemented in hardware, or may be configured using a programmable device. The processor 321 may also serve the functions of the image processing unit 343. That is, the functions of the image processing unit 343 may be executed by the processor 321.

The processor 321 controls each unit of the third projection device 3 by executing the control program 326 stored in the memory 325. The processor 321 includes a projection control unit 322 and a third filter 323. These are functional units implemented in cooperation of hardware and software when the processor 321 executes the control program 326.

The projection control unit 322 receives an image transmitted by the second projection device 2A with the third communication unit 342. The image received by the third communication unit 342 from the second projection device 2A is referred to as a third reception image. The projection control unit 322 causes the third projection unit 310 to project an image based on the third reception image to the third projection target OB3. The projection control unit 322 causes the third image-capturing unit 315 to capture a range including the third projection target OB3 to acquire a third captured image. The projection control unit 322 uses the third filter 323 to execute filtering on the third captured image, and causes the third communication unit 342 to transmit the third transmission image generated from the filtering to the second projection device 2A. The image captured by the third projection device 3 is referred to as a third captured image, and an image generated by the third projection device 3 filtering the third captured image is referred to as a third transmission image. In addition, the third transmission image is also an image transmitted by the third projection device 3 to the second projection device 2A.

The third filter 323 filters the third captured image based on the third reception image. Specifically, the third filter 323 performs processing of removing the image overlapping the third reception image from the third captured image.

In the projection system 100A, states of the first projection target OB1 and the second projection target OB2 can be shared between the first projection device 1 and the second projection device 2A as the first projection device 1 performs operations as in the first embodiment. The third projection device 3 operates similarly to the first projection device 1. The third projection device 3 shares states of the second projection target OB2 and the third projection target OB3 with the second projection device 2A. Since the second projection device 2A shares images with each of the first projection device 1 and the third projection device 3, two areas are provided in the second projection target OB2.

The second projection device 2A is provided with a first area AR1 and a second area AR2 in the second projection target OB2 as illustrated in FIG. 8. Specifically, the second projection device 2A divides a projection image PP2 into the first area AR1 and the second area AR2, and places different images in each of the areas. Thus, different images are projected onto the portion corresponding to the first area AR1 and the portion corresponding to the second area AR2 in the second projection target OB2. An object OB23 is positioned in the first area AR1, and an object OB22 is positioned in the second area AR2. The first area AR1 and the second area AR2 are virtual areas, and there is no need to provide a real partition partitioning the first area AR1 and the second area AR2 in the second projection target OB2.

The projection control unit 222 of the second projection device 2A receives a second reception image from the first projection device 1 with the second communication unit 242. The projection control unit 222 causes the second projection unit 210 to project an image based on the second reception image to the second projection target OB2. The projection control unit 222 receives an image transmitted by the third projection device 3 with the second communication unit 242. The image that the second communication unit 242 of the second projection device 2A receives from the third projection device 3 is referred to as a fourth reception image. The projection control unit 222 causes the second projection unit 210 to project an image based on the fourth reception image to the second projection target OB2.

Here, the projection control unit 222 projects the second reception image onto the first area AR1, and projects the fourth reception image onto the second area AR2. Since the first area AR1 is smaller than the entire projection image of the second projection unit 210, the projection control unit 222 causes the resolution conversion unit 224 to perform processing of converting the resolution of the second reception image. The resolution conversion unit 224 converts the resolution of the second reception image to a resolution for projection. A resolution for projection of the second reception image is a projection resolution of the second projection unit 210 corresponding to the first area AR1. The resolution for projection can be determined, for example, from a ratio of the first area AR1 to the entire projection area of the second projection unit 210.

In addition, the projection control unit 222 causes the resolution conversion unit 224 to perform processing of converting the resolution of the fourth reception image. The resolution conversion unit 224 converts the resolution of the fourth reception image to a resolution for projection. A resolution for projection of the fourth reception image is a projection resolution of the second projection unit 210 corresponding to the second area AR2. The resolution for projection can be determined, for example, from a ratio of the second area AR2 to the entire projection area of the second projection unit 210.

The projection control unit 222 causes the second image-capturing unit 215 to capture a range including the second projection target OB2 to acquire a second captured image. The projection control unit 222 divides the second captured image into a captured image in the range corresponding to the first area AR1 and a captured image in the range corresponding to the second area AR2.

The projection control unit 222 generates a first processed image by performing filtering using the second filter 223 on the captured image in the range corresponding to the first area AR1. Here, the second filter 223 removes an image overlapping the second reception image from the captured image in the range corresponding to the first area AR1 by performing filtering based on the second reception image. Furthermore, the projection control unit 222 causes the resolution conversion unit 224 to perform processing of converting the resolution of the first processed image such that the resolution of the first processed image is converted to a resolution corresponding to the projection resolution of the first projection device 1. The projection control unit 222 transmits the first processed image that has undergone the resolution conversion processing to the first projection device 1 as a second transmission image.

The projection control unit 222 generates a second processed image by performing filtering using the second filter 223 on the captured image in the range corresponding to the second area AR2. Here, the second filter 223 removes an image overlapping the second reception image from the captured image in the range corresponding to the second area AR2 by performing filtering based on the second reception image. Furthermore, the projection control unit 222 causes the resolution conversion unit 224 to perform processing of converting the resolution of the second processed image such that the resolution of the second processed image is converted to a resolution corresponding to the projection resolution of the third projection device 3. The projection control unit 222 transmits the second processed image that has undergone the resolution conversion processing to the third projection device 3 as a fourth transmission image. The image generated by the second projection device 2A filtering the second captured image is referred to as a fourth transmission image. In addition, the fourth transmission image is also an image transmitted by the second projection device 2A to the third projection device 3.

Next, the operations of the projection system 100A in the second embodiment will be described. The operation of the first projection device 1 in the second embodiment is common to the operation described in the first embodiment. In addition, the operation of the third projection device 3 is common to the operation of the first projection device 1 described in the first embodiment. Thus, the operation of the second projection device 2A will be described here in accordance with the flowchart of FIG. 10.

The processing of steps SB31 to SB48 of FIG. 10 is performed by the second control unit 220 of the second projection device 2A.

In step SB31, the second projection device 2A receives an image with the second communication unit 242. In step SB32, the second projection device 2A determines whether the transmission source of the reception image is the transmission source corresponding to the first area AR1. That is, the second projection device 2A determines whether the transmission source of the image received in step SB31 is the first projection device 1 or the third projection device 3.

If it is determined that the transmission source of the image is the first projection device 1, that is, the transmission source corresponds to the first area AR1 (step SB32; YES), the second projection device 2A proceeds to step SB33. In this case, the image received in step SB31 is a second reception image received from the first projection device 1. In step SB33, the second projection device 2A converts the resolution of the second reception image with the resolution conversion unit 224. In step SB34, the second projection device 2A projects the second reception image that has been processed for resolution conversion by the resolution conversion unit 224 onto the first area AR1 of the second projection target OB2 by using the second projection unit 210. In step SB34, when the second projection unit 210 is projecting the image, the second projection device 2A updates the projection image of the second projection unit 210 based on the second reception image that has been processed for resolution conversion.

If it is determined that the transmission source of the image is the third projection device 3, that is, the transmission source is not the transmission source corresponds to the first area AR1 (step SB32; NO), the second projection device 2A proceeds to step SB35. In this case, the image received in step SB31 is a fourth reception image received from the third projection device 3. In step SB35, the second projection device 2A converts the resolution of the fourth reception image with the resolution conversion unit 224. In step SB36, the second projection device 2A projects the fourth reception image that has been processed for resolution conversion by the resolution conversion unit 224 onto the second area AR2 of the second projection target OB2 by using the second projection unit 210. In step SB36, when the second projection unit 210 is projecting the image, the second projection device 2A updates the projection image of the second projection unit 210 based on the fourth reception image that has been processed for resolution conversion.

The second projection device 2A performs capturing with the second image-capturing unit 215 in step SB37 to acquire a second image-captured image in step SB38. In step SB39, the second projection device 2A divides the second captured image into a captured image in a range corresponding to the first area AR1 and a captured image in a range corresponding to the second area AR2. In step SB40, the second projection device 2A executes the resolution conversion processing with the resolution conversion unit 224 on each of the images divided in step SB39. For example, in step SB40, the second projection device 2A causes the resolution conversion unit 224 to match the resolution of the captured image in the range corresponding to the first area AR1 with the resolution of the second reception image. In addition, for example, the second projection device 2A causes the resolution conversion unit 224 to match the resolution of the captured image in the range corresponding to the second area AR2 with the resolution of the fourth reception image in step SB40.

In step SB41, the second projection device 2A acquires the resolution-converted captured image in the range corresponding to the first area AR1. In step SB42, the second projection device 2A acquires the second reception image. Specifically, the second projection device 2A acquires the last second reception image received from the first projection device 1 before step SB42.

In step SB43, the second projection device 2A generates a first processed image by performing filtering using the second filter 223 based on the second reception image. Specifically, the second projection device 2A removes an image overlapping images included in the second reception image from the captured image acquired in step SB41.

In step SB44, the second projection device 2A acquires the resolution-converted captured image in the range corresponding to the second area AR2. In step SB45, the second projection device 2A acquires a fourth reception image. Specifically, the second projection device 2A acquires the last fourth reception image received from the third projection device 3 before step SB45.

In step SB46, the second projection device 2A generates a second processed image by performing filtering using the second filter 223 based on the fourth reception image. Specifically, the second projection device 2A removes an image overlapping images included in the fourth reception image from the captured image acquired in step SB44.

In step SB47, the second projection device 2A transmits the first processed image as a second transmission image to the first projection device 1 by using the second communication unit 242, and transmits the second processed image as a fourth transmission image to the third projection device 3.

The second projection device 2A determines whether the operation is to be ended in step SB48. If it is determined to end the operation, such as if the operation indicating the end of the operation is detected by the input interface 233 (step SB48; YES), the second projection device 2A ends the present process. If it is determined that the operation is not to be ended (step SB48; NO), the second projection device 2A returns to step SB31.

FIG. 11 illustrates a visual recognition state of the first projection device 1 and the second projection device 2A as an operating state of the projection system 100A. Since the visual recognition state of the third projection device 3 is common to that of the first projection device 1, it is omitted in the drawing.

FIG. 11 illustrates a visual recognition state ST11 of the first projection target OB1 of the first projection device 1, a visual recognition state ST12 of the second projection target OB2 of the second projection device 2A, and images transmitted and received to and from the first projection device 1 and the second projection device 2A.

The object OB12 is placed in the plane OB11 in the first projection target OB1 as illustrated in FIG. 8. This visual recognition state is seen as in the upper section of ST11 in FIG. 11, and the real object OB12 is visually recognized. In addition, paper or the like is placed on the plane OB11, and a user using the first projection device 1 can write characters or figures on the plane OB11 using a writing instrument. In addition, objects OB22 and OB23 are placed on the plane OB21 in the second projection target OB2. This state is not illustrated in FIG. 11. In addition, paper or the like is placed on the plane OB21 as on the plane OB11, and a user using the second projection device 2A can write characters or figures on the plane OB21 using a writing instrument. The object OB23 is positioned in the first area AR1, and the object OB22 is positioned in the second area AR2.

The first projection device 1 generates a first transmission image by performing filtering, with the first filter 123, on the first captured image obtained by the first image-capturing unit 115 capturing the first projection target OB1. The first projection device 1 transmits the first transmission image as an image SP11 to the second projection device 2A. This state is represented by the image SP11 in FIG. 11.

The second projection device 2A receives the image SP11 as a second reception image. The second projection device 2A converts the resolution of the second reception image. The second projection device 2A projects the resolution-converted second reception image onto the first area AR1. At this time, the object OB22 is present in the first area AR1, and an object image OP1 is projected in the area. This visual recognition state is shown in the upper section of ST2 in FIG. 11, and the real object OB23 and the object image OP1 being a projection image of the object OB12 are visually recognized in the first area AR1, and the real object OB22 is visually recognized in the second area AR2.

The second projection device 2A captures the second projection target OB2 using the second image-capturing unit 215 to generate a second captured image. In the second captured image, the state of the first area AR1 and the state of the second area AR2 are displayed. The second projection device 2A divides the second captured image. The second projection device 2A generates a first processed image by performing filtering based on the image SP11, which is the first transmission image, on the captured image in the range corresponding to the first area AR1. Furthermore, the second projection device 2A has the resolution conversion unit 224 to convert the resolution of the first processed image and thereby generating the first processed image having a resolution corresponding to the projection resolution of the first projection device 1, and transmits the first processed image as a second transmission image. The second projection device 2A transmits the first processed image as an image SP31 to the first projection device 1. This state is represented by the image SP31 in FIG. 11.

The first projection device 1 receives the image SP31 as a first reception image and projects the image onto the first projection target OB1 using the first projection unit 110. Thus, the object OB12 and an object image OP2 are visually recognized in the first projection target OB1. This visual recognition state is seen as in the middle section of ST1 in FIG. 11, and the real object OB12 and the object image OP2 being a projection image of the object OB23 are visually recognized.

Here, an example in which the user of the first projection device 1 writes a handwritten figure OB13 on the plane OB11 will be introduced. The handwritten figure OB13 is visually recognized in the first projection target OB1, in addition to the object OB12 and the object image OP2. This visual recognition state is seen as in the lower section of ST11 in FIG. 11, and the real object OB12, the handwritten figure OB13, and the object image OP2 being a projection image of the object OB22 are visually recognized.

The first projection device 1 performs filtering based on the image SP31 on the first captured image obtained by the first image-capturing unit 115 image-capturing the first projection target OB1 to generate an image SP12 which is a first transmission image. The image SP12 includes the object image OP1, which is the image of the object OB12, and an object image OP3, which is the image of the handwritten figure OB13, and does not include the object image OP2. The first projection device 1 transmits the image SP12 as the first transmission image to the second projection device 2A. This state is represented by the image SP12 in FIG. 11.

The second projection device 2A receives the image SP12 as a second reception image. The second projection device 2A converts the resolution of the second reception image. The second projection device 2A projects the resolution-converted second reception image onto the first area AR1. Thus, in the first area AR1 of the second projection target OB2, the object OB22 and the object images OP1 and OP3 projected by the second projection unit 210 are visually recognized. This visual recognition state is shown in the lower section of ST2 in FIG. 11, and the real object OB23, the object image OP1 being a projection image of the object OB12 and the object image OP3 being a projection image of the figure OB13 are visually recognized in the first area AR1, and the real object OB22 is visually recognized in the second area AR2.

In this manner, in the projection system 100A, the images of the object OB12 and the handwritten figure OB13 installed in the first projection target OB1 are projected on the second projection target OB2. In addition, the image of the object OB23 installed in the second projection target OB2 is projected on the first projection target OB1. Thus, the states of the first projection target OB1 and the second projection target OB2 can be shared between the first projection device 1 and the second projection device 2A.

The second projection device 2A executes the operation illustrated in FIG. 11 with respect to the third projection device 3 as described with reference to FIG. 10. Thus, an image of an object OB32 installed in the third projection target OB3 is projected in the second area AR2 of the second projection target OB2. In addition, an image of the object OB22 disposed in the second area AR2 of the second projection target OB2 is projected on the third projection target OB3. Thus, the states of the second projection target OB2 and the third projection target OB3 can be shared between the second projection device 2A and the third projection device 3.

Thus, the projection system 100A is designed to enable the first projection device 1 and the second projection device 2A, and the third projection device 3 and the second projection device 2A to share states of the projection targets. The second projection device 2A shares states of the first area AR1 of the second projection target OB2 with the first projection device 1, and shares states of the second area AR2 with the third projection device 3. Thus, the user using the second projection device 2A can share the states of the projection areas while distinguishing the states of the first projection device 1 and the states of the third projection device 3.

In addition, the second projection device 2A performs the resolution conversion processing on the second reception image received from the first projection device 1 and the fourth reception image received from the third projection device 3. Thus, the second projection device 2A can use the second projection target OB2 with a limited area to share the images with both the first projection device 1 and the third projection device 3.

Furthermore, the second projection device 2A divides the second captured image and performs the resolution conversion processing on each of the captured image in the range corresponding to the first area AR1 and the captured image in the range corresponding to the second area AR2. Thus, processing of removing the image overlapping the fourth reception image from the captured image, and processing of removing the image overlapping the second reception image from the captured image can be swiftly performed. In addition, the first processed image has the resolution corresponding to the projection resolution of the first projection device 1, and the second processed image has a resolution corresponding to the projection resolution of the third projection device 3. Thus, the images can be shared with both the first projection device 1 and the third projection device 3 without increasing processing loads on the first projection device 1 and the third projection device 3.

As described above, the projection system 100A of the second embodiment includes the third projection device 3. The third projection device 3 includes the third communication unit 342 that communicates with the second projection device 2A to receive the third reception image, the third projection unit 310 that projects the third reception image onto the third projection target OB3, and the third image-capturing unit 315 that captures a range including the third projection target OB3. The third projection device 3 generates a third transmission image by removing an image overlapping the third reception image from the third captured image captured by the third image-capturing unit 315, and transmits the third transmission image by using the third communication unit 342. The second projection device 2A receives the fourth reception image from the third projection device 3 with the second communication unit 242, and projects the second reception image in the first area AR1 of the second projection target with the second projection unit, and projects the fourth reception image in the second area AR2 of the second projection target. The second transmission image generated by the second projection device 2A includes the first processed image and the second processed image. The second projection device 2A generates the first processed image by removing the image overlapping the second reception image from the captured image in the range corresponding to the first area AR1 of the second captured image, and transmits the first processed image to the first projection device 1. The second projection device 2A generates the second processed image by removing the image overlapping the fourth reception image from the captured image in the range corresponding to the second area AR2 of the second captured image, and transmits the second processed image to the third projection device 3.

Thus, the projection system 100A enables the first projection device 1 and the second projection device 2A to share states of the first projection target OB1 and the second projection target OB2. Furthermore, the projection system 100A enables the second projection device 2A and the third projection device 3 to share states of the second projection target OB2 and the third projection target OB3. Furthermore, in the projection system 100A, a state in which a projection image projected by the first projection device 1 onto the first projection target OB1 unnaturally overlaps with the real first projection target OB1 can be prevented. Likewise, a state in which a projection image projected by the second projection device 2 onto the second projection target OB2 unnaturally overlaps with the real second projection target OB2 can be prevented. Furthermore, a state in which a projection image projected by the third projection device 3 onto the third projection target OB3 unnaturally overlaps with the real third projection target OB3 can be prevented. As a result, the user can visually recognize the first projection target OB1, the second projection target OB2, and the third projection target OB3 with good visibility.

In the projection system 100A, the third projection device 3 generates the third transmission image by removing an image overlapping the third reception image from the third captured image by using the third filter 323. Thus, the processing performed by using the third filter 323 makes it possible to prevent the projection image projected from the second projection device 2A in the second area AR2 from unnaturally overlapping on the real second projection target OB2.

The second projection device 2A includes the second filter 223 that removes an image overlapping the second reception image from the second captured image. The second projection device 2A generates the first processed image by removing the image overlapping the second reception image from the image of the second captured image in the range corresponding to the first area AR1 by using the second filter 223. The second projection device 2A generates the second processed image by removing the image overlapping the fourth reception image from the image of the second captured image in the range corresponding to the second area AR2 by using the second filter 223. Thus, the second projection device 2A can use the second projection target OB2 to share the images with both the first projection device 1 and the third projection device 3.

The second projection device 2A is configured to execute the resolution conversion processing. The second projection device 2A transmits the first processed image with the resolution corresponding to the second reception image to the first projection device 1, and transmits the second processed image with the resolution corresponding to the fourth reception image to the third projection device 3. In this way, the first processed image with the resolution that can be processed by the first projection device 1 is transmitted from the second projection device 2A to the first projection device 1, and the second processed image with the resolution that can be processed by the third projection device 3 is transmitted to the third projection device 3. Thus, the second projection device 2A can share the images with both the first projection device 1 and the third projection device 3 without increasing processing loads on the first projection device 1 and the third projection device 3.

3. Other Embodiments

The above-described embodiments are preferred embodiments of the present disclosure. However, the disclosure is not limited to those embodiments, and various modifications can be applied to the exemplary embodiments without departing from the gist of the present disclosure.

The configurations illustrated in FIGS. 3 and 4 are examples, and the configurations of the first projection unit 110 and the first image-capturing unit 115 included in the first projection device 1 can be freely changed. For example, the first image-capturing unit 115 may be configured separately from the first projection device 1. The same applies to the configurations of the second projection unit 210 and the second image-capturing unit 215 included in the second projection devices 2 and 2A. The same applies to the configurations of the third projection unit 310 and the third image-capturing unit 315 included in the third projection device 3.

The configuration of each device illustrated in FIGS. 2 and 9 represents a functional configuration, does not particularly limit a specific implementation. In other words, hardware that individually corresponds to each of the functional units is not necessarily implemented, and a configuration is possible as a matter of course in which a single processor executes a program to enable functions of a plurality of functional units. Furthermore, in the above-described embodiments and modified examples, some of the functions realized by software may be realized by hardware, or some of the functions realized by hardware may be realized by software.

In addition, processing units of the sequence diagram shown in FIG. 5 and the flowcharts shown in FIGS. 6 and 10 are obtained by dividing the processing based on main processing contents in order to facilitate the understanding of the operations of each device included in the projection systems 100 and 100A. The present disclosure is not limited by the way of dividing the processing units of each flowchart or the names thereof. The processing executed by each device can be divided according to the processing contents or further into many processing units, and can be divided such that one processing unit includes more processing operations.

The control program 126 can also be recorded in a recording medium recorded such that it can be readable by the first projection device 1, for example. The recording medium can be a magnetic or optical recording medium, or a semiconductor memory device. Specifically, a portable recording medium such as a flexible disk, an optical disc-type recording medium, a magneto-optical disk recording medium, or a semiconductor storage device, or a fixed-type recording medium is exemplified. Furthermore, a configuration in which these programs may be stored in a server device and the program is downloaded from the server device as necessary may be applied. The same applies to the control programs 226 and 326.

What is claimed is:

1. A projection system comprising:
 a first projection device including
  a first communication unit configured to receive a first reception image,
  a first projection unit configured to project the first reception image onto a first projection target,
  a first image-capturing unit configured to capture a range including the first projection target, and
  a first control unit configured to generate a first transmission image by removing, from a first captured image captured by the first image-capturing unit, an image overlapping the first reception image and to transmit the first transmission image by using the first communication unit; and
 a second projection device including
  a second communication unit configured to communicate with the first projection device to receive the first transmission image as a second reception image,
  a second projection unit configured to project the second reception image onto a second projection target,
  a second image-capturing unit configured to capture a range including the second projection target, and
  a second control unit configured to generate a second transmission image by removing, from a second captured image captured by the second image-capturing unit, an image overlapping the second reception image and to transmit the second transmission image that is to be the first reception image by using the second communication unit.

2. The projection system according to claim 1, wherein the first projection device generates the first transmission image by removing the image overlapping the first reception image from the first captured image by using a first filter.

3. The projection system according to claim 1, wherein the second projection device generates the second transmission image by removing the image overlapping the second reception image from the second captured image by using a second filter.

4. A projection system according to claim 1, comprising:
 a third projection device including
  a third communication unit configured to communicate with the second projection device to receive a third reception image,
  a third projection unit configured to project the third reception image onto a third projection target,
  a third image-capturing unit configured to capture a range including the third projection target, and
  a third control unit configured to generate a third transmission image by removing, from a third captured image captured by the third image-capturing unit, an image overlapping the third reception image and to transmit the third transmission image by using the third communication unit, wherein
 the second projection device
  receives a fourth reception image from the third projection device by using the second communication unit,
  projects, by using the second projection unit, the second reception image in a first area of the second projection target and projects the fourth reception image in a second area of the second projection target, the second transmission image including a first processed image and a second processed image, generates the first processed image by removing the image overlapping the second reception image from an image of the second captured image in a range corresponding to the first area, and transmits the first processed image to the first projection device, and generates the second processed image by removing an image overlapping the fourth reception image from an image of the second captured image in a range corresponding to the second area, and transmits the second processed image to the third projection device.

5. The projection system according to claim 4, wherein the third projection device generates the third transmission image by removing the image overlapping the third reception image from the third captured image by using a third filter.

6. The projection system according to claim 4, wherein the second projection device further includes a second filter configured to remove the image overlapping the second reception image from the second captured image, generates, by using the second filter, the first processed image by removing the image overlapping the second reception image from the image of the second captured image in the range corresponding to the first area, and generates, by using the second filter, the second processed image by removing the image overlapping the fourth reception image from the image of the second captured image in the range corresponding to the second area.

7. The projection system according to claim 4, wherein the second projection device is configured to execute resolution conversion processing, transmit the first processed image with a resolution corresponding to the second reception image to the first projection device, and transmit the second processed image with a resolution corresponding to the fourth reception image to the third projection device.

8. The projection system according to claim 1, wherein the first projection unit includes an imaging light forming unit configured to form imaging light, and a projection optical system configured to project the imaging light toward the first projection target, and the first image-capturing unit includes an imaging device configured to receive light incident through the projection optical system.

9. A control method for a first projection device, a second projection device, and a projection system, wherein the first projection device communicates with the second projection device to receive a first reception image, projects the first reception image onto a first projection target, captures a range including the first projection target, and generates a first transmission image by removing, from a first captured image obtained by capturing the first projection target, an image overlapping the first reception image and transmits the first transmission image to the second projection device, and the second projection device communicates with the first projection device to receive a second reception image, projects the second reception image onto a second projection target, captures a range including the second projection target, and generates a second transmission image by removing, from a second captured image obtained by capturing the second projection target, an image overlapping the second reception image and transmits the second transmission image to the first projection device.

* * * * *